(12) United States Patent
Bulut et al.

(10) Patent No.: US 12,032,702 B2
(45) Date of Patent: Jul. 9, 2024

(54) AUTOMATED HEALTH-CHECK RISK ASSESSMENT OF COMPUTING ASSETS

(71) Applicant: International Business Machines Corporation, Armonk, NY (US)

(72) Inventors: Muhammed Fatih Bulut, West Greenwich, RI (US); Milton H. Hernandez, Tenafly, NJ (US); Robert Filepp, Westport, CT (US); Sai Zeng, Yorktown Heights, NY (US); Steven Ocepek, Cuyahoga Falls, OH (US); Srinivas Babu Tummalapenta, Broomfield, CO (US); Daniel S. Riley, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 445 days.

(21) Appl. No.: 17/078,563

(22) Filed: Oct. 23, 2020

(65) Prior Publication Data

US 2022/0129560 A1    Apr. 28, 2022

(51) Int. Cl.
*G06F 21/57*    (2013.01)
*G06N 20/00*    (2019.01)
(Continued)

(52) U.S. Cl.
CPC ........... *G06F 21/577* (2013.01); *G06N 20/00* (2019.01); *G06F 2221/034* (2013.01);
(Continued)

(58) Field of Classification Search
CPC . G06F 21/577; G06F 2221/034; G06N 20/00; G06Q 10/0635; G06Q 10/0637;
(Continued)

(56) References Cited

U.S. PATENT DOCUMENTS 6,895,383 B2    5/2005    Heinrich
6,912,502 B1    6/2005    Buddle et al.
(Continued)

FOREIGN PATENT DOCUMENTS

CN    104040554 A    9/2014
CN    107067179 A    8/2017

OTHER PUBLICATIONS

Title: Model-based risk assessment to improve enterprise security Author(s): Jan Oyvind Aagedal, Folker den Braber, Theo Dimitrakos, Bjorn Axel Gran, Dimitris Raptis and Ketil Stolen Date: 2002 Publisher: IEEE.*

(Continued)

*Primary Examiner* — Shahriar Zarrineh
*Assistant Examiner* — Gita Faramarzi
(74) *Attorney, Agent, or Firm* — Amin, Turocy & Watson, LLP

(57) ABSTRACT

Systems and techniques that facilitate automated health-check risk assessment of computing assets are provided that can generate a baseline health-check risk score that corresponds to non-compliance of a computing asset with a stipulated control, and can adjust the baseline health-check risk score based on a weakness factor of the stipulated control, an environmental factor of the computing asset, a criticality factor of the computing asset, and a maturity factor of the computing asset.

20 Claims, 15 Drawing Sheets

(51) Int. Cl.
  *G06Q 10/0635* (2023.01)
  *G06Q 10/0637* (2023.01)
  *G06Q 10/0639* (2023.01)
  *G06Q 10/10* (2023.01)
  *G06Q 40/02* (2023.01)
  *G06Q 40/04* (2012.01)

(52) U.S. Cl.
  CPC ..... *G06Q 10/0635* (2013.01); *G06Q 10/0637* (2013.01); *G06Q 10/06393* (2013.01); *G06Q 10/10* (2013.01); *G06Q 40/02* (2013.01); *G06Q 40/04* (2013.01)

(58) Field of Classification Search
  CPC .. G06Q 10/06393; G06Q 10/10; G06Q 40/02; G06Q 40/04
  See application file for complete search history.

(56) References Cited

U.S. PATENT DOCUMENTS

| | | | |
|---|---|---|---|
| 7,975,286 | B1 | 7/2011 | Fickey et al. |
| 8,478,628 | B1 | 7/2013 | Schlarman |
| 8,494,977 | B1 | 7/2013 | Yehuda et al. |
| 8,595,845 | B2 | 11/2013 | Basavapatna et al. |
| 9,021,595 | B2 | 4/2015 | Schrecker et al. |
| 9,411,965 | B2 | 8/2016 | Giakouminakis et al. |
| 10,320,830 | B2 | 6/2019 | Ahuja et al. |
| 10,692,032 | B2 | 6/2020 | Ray |
| 2006/0136327 | A1 | 6/2006 | You |
| 2007/0101432 | A1 | 5/2007 | Carpenter |
| 2009/0319420 | A1 | 12/2009 | Sanchez et al. |
| 2010/0324952 | A1 | 12/2010 | Bastos et al. |
| 2012/0011077 | A1 | 1/2012 | Bhagat |
| 2013/0253979 | A1* | 9/2013 | Williams ........... G06Q 10/0635 705/7.28 |
| 2018/0018602 | A1* | 1/2018 | DiMaggio .............. G16H 10/60 |
| 2019/0020669 | A1* | 1/2019 | Glatfelter .............. G06F 21/554 |
| 2019/0075082 | A1 | 3/2019 | Adam et al. |
| 2019/0182289 | A1 | 6/2019 | White |
| 2019/0236606 | A1* | 8/2019 | Padmanabhan ....... H04L 9/3239 |
| 2019/0258807 | A1* | 8/2019 | DiMaggio ............. G06F 21/577 |
| 2019/0394238 | A1 | 12/2019 | Putz et al. |
| 2020/0027096 | A1* | 1/2020 | Cooner .................. G06Q 40/04 |
| 2022/0058266 | A1* | 2/2022 | Modi ...................... G06F 21/57 |
| 2022/0083040 | A1* | 3/2022 | Akkaram ........... G05B 23/0289 |

OTHER PUBLICATIONS

Title: The Common Configuration Scoring System (SSCC): Metrices for Software Security Configuration Vulnerabilities Publisher: NIST Authors: Karen Scarfone and Peter Mell (Year: 2010).*

Karen Scarfone and Peter Mel, "The Common Configuration Scoring System(SSCC): Metrices for Software Security Configuration Vulnerabilities", Publisher: NIST , (Year:2010), 36 pages (Year: 2010).*

Mell et al., "The NIST Definition of Cloud Computing," Recommendations of the National Institute of Standards and Technology, NIST Special Publication 800-145, Sep. 2011, 7 pages.

Scarfone et al., "The Common Configuration Scoring System (CCSS): Metrics for Software Security Configuration Vulnerabilities," National Institute of Standards and Technology, NIST Interagency Report 7502, Dec. 2010, 42 pages.

International Search Report and Written Opinion for International Application No. PCT/CN2021/115671 dated Dec. 8, 2021, 9 pages.

* cited by examiner

Weakness Factor Based on Control Type and Degree of Non-Compliance

| Weakness Category | Description | Sub-Type | Weakness Factor |
|---|---|---|---|
| Passive Weakness | Failure to comply with stipulated control risks enabling attacker to prevent computing asset from performing authorized actions (e.g., preventing execution of a particular component, preventing generation of audit log records). | N/A | 0 |
| Active Weakness | Failure to comply with stipulated control risks enabling attacker to perform unauthorized actions (e.g., accessing sensitive data). | Direct (e.g., known exploit already exists for this control) | 3 |
| | | Indirect (e.g., no known exploit yet exists for this control) | Function of severity of non-compliance with stipulated control |

| Environmental Factor Based on Security Characteristics | | |
|---|---|---|
| Access | Internal Only | 0.2 |
| | Accessible from Public | 0.6 |
| Modification Paradigm | Immutable | 0.4 |
| | Mutable/Ephemeral | 0.6 |
| Instantiation Paradigm | Isolated | 0.4 |
| | Multi-Tenancy | 0.6 |
| Service Availability | Servicing/Maintenance Still Available | 1 |
| | Servicing/Maintenance No Longer Available | 1.5 |
| Data Protection Protocol | Automatic Discovery and Classification | 0.8 |
| | Masking, Encryption | 0.2 |
| Compliance Enforcement | Inspection Only | 0.8 |
| | Inspection and Remediation | 0.2 |
| Anomaly Detection | Notification Only | 0.8 |
| | Notification and Prevention | 0.2 |

AUTOMATED HEALTH-CHECK RISK ASSESSMENT OF COMPUTING ASSETS

BACKGROUND

The subject disclosure relates to computing assets, and more specifically to automated health-check risk assessment of computing assets.

A computing asset can be any suitable combination of computer hardware and/or computer software. A computing asset can be subject to one or more controls. In various aspects, a control can be a standard, regulation, rule, and/or benchmark which is designed to enhance and/or safeguard computing security and/or cybersecurity. For instance, controls can include Center for Internet Security (CIS) benchmarks, Security Technical Implementation Guides (STIGs), industry standards, and/or any other suitable technical regulations. In various instances, controls can regulate and/or pertain to any suitable technical property/characteristic of a computing asset. If a computing asset complies with stipulated controls, the computing asset can be considered as minimizing its vulnerability to security breaches and/or exploitation. However, if a computing asset does not comply with stipulated controls, the computing asset can be considered as vulnerable and/or compromised in terms of data security.

Health-checks can be periodically performed on a computing asset to determine whether the computing asset satisfies stipulated controls. In various cases, a health-check can be a security process which checks information technology systems and/or application configurations in order to harden the systems and/or configurations so as to prevent and/or mitigate attacks. Often, computing systems can be made up of many different computing assets, and the number of non-compliant controls can be so large as to overwhelm an operator of the computing system. In such case, different non-compliant controls of different computing assets can pose different risks, and the operator of the computing system can be unsure of how to triage the non-compliant controls.

Conventionally, health-check risk assessment is performed to assign severity levels to non-compliant controls. For instance, health-check risk scores can be assigned to different controls via the Common Configuration Scoring System (CCSS), and risk for various computing assets can be derived from these scores based on the non-compliant controls. However, such conventional health-check risk assessment techniques are generally manual processes that are performed by human operators once or twice per year. Even for conventional health-check risk assessment techniques that implement automation, they are based on subjective assessments of operators and are thus error prone and non-standardized. Moreover, such conventional health-check risk assessment techniques ignore various important aspects of computing assets and non-compliant controls, as explained herein.

Systems and/or techniques that can ameliorate and/or solve one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate automated health-check risk assessment of a computing asset are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a baseline component that can generate a baseline health-check risk score that corresponds to non-compliance of a computing asset with a stipulated control. In various aspects, the computer-executable components can further comprise an adjustment component that can adjust the baseline health-check risk score based on a weakness factor of the stipulated control. In some cases, the weakness factor can be based on a magnitude by which a state of the computing asset deviates from the stipulated control. In various embodiments, the adjustment component can further adjust the baseline health-check risk score based on an environmental factor of the computing asset. In various cases, the environmental factor can be based on security mechanisms or security protocols associated with the computing asset. In various embodiments, the adjustment component can further adjust the baseline health-check risk score based on a criticality factor. In some instances, the critical factor can be based on a level of importance of the computing asset. In various embodiments, the adjustment component can further adjust the baseline health-check risk score based on a maturity factor. In some aspects, the maturity factor can be based on a difference between the stipulated control and a recommended control.

According to one or more embodiments, the above-described system can be implemented as a computer-implemented method and/or computer program product.

DESCRIPTION OF THE DRAWINGS

FIG. 4 illustrates an example, non-limiting table associated with weakness factors in accordance with one or more embodiments described herein.

FIG. 6 illustrates an example, non-limiting table associated with environmental factors in accordance with one or more embodiments described herein.

DETAILED DESCRIPTION

Figure 1:
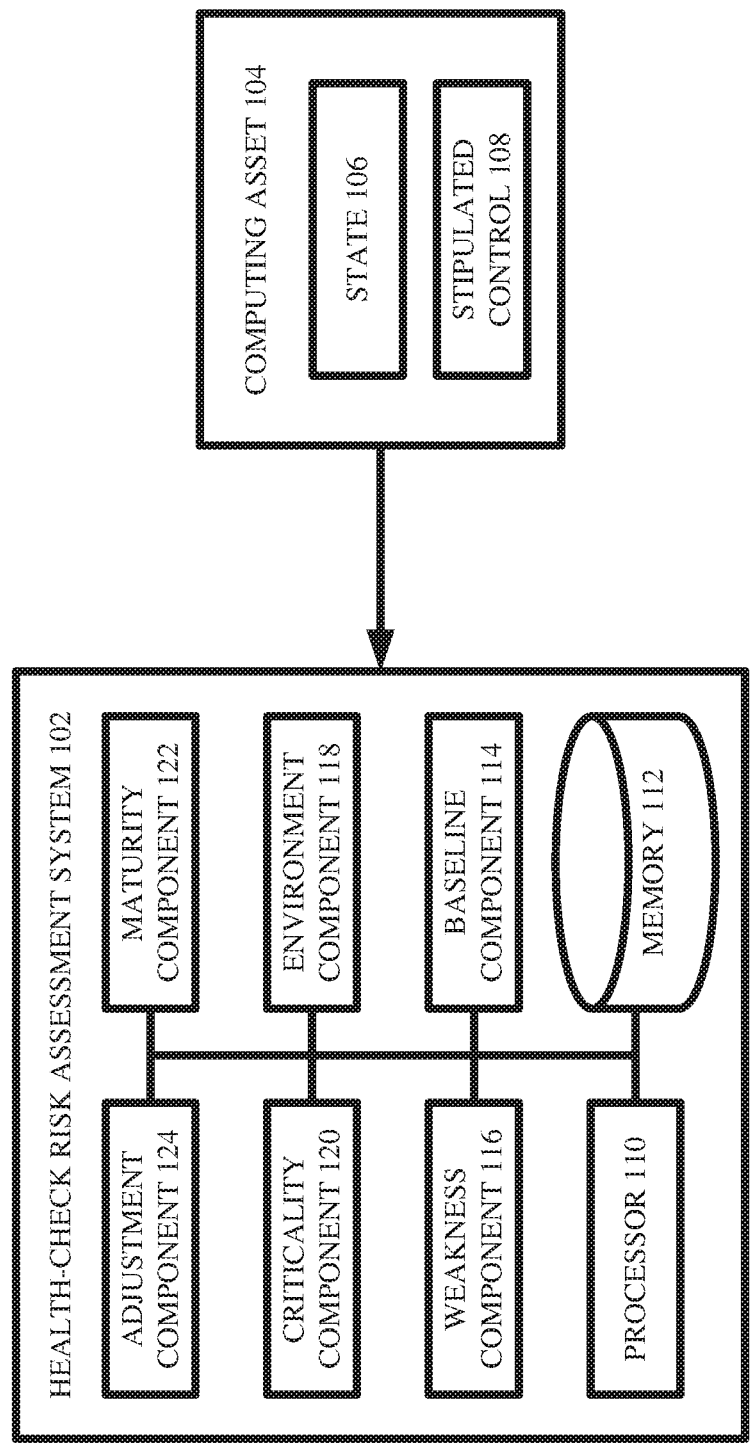
FIG. 1 illustrates a block diagram of an example, non-limiting system that facilitates automated health-check risk assessment of computing assets in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A computing asset can be any suitable combination of computer hardware and/or computer software (e.g., a server, a datacenter, a software application, a browser, a network, a laptop computer, a mobile computing device, and/or any other suitable information technology system). As mentioned above, a computing asset can be subject to and/or governed by one or more controls, which can take the form of standards, regulations, rules, and/or benchmarks that are designed, configured, and/or intended to enhance and/or safeguard computing security and/or cybersecurity. For instance, controls can include Center for Internet Security (CIS) benchmarks, Security Technical Implementation Guides (STIGs), industry standards, and/or any other suitable technical regulations that are aimed at improving computing security. As an example, a computing asset can electronically store/maintain password-protected data. In such case, a first control can stipulate that the password should be of a minimum character length (e.g., at least 10 characters long), a second control can stipulate that the password should include particular character types (e.g., numbers, letters, punctuation marks, other symbols), and/or a third control can stipulate that the password should be younger than a maximum age (e.g., less than 90 days old). In various instances, controls can regulate and/or pertain to any suitable technical property/characteristic of a computing asset (e.g., passwords, privileges/permissions, data management policies, data storage policies, authentication policies, auditing policies, infrastructure). If a computing asset complies with stipulated controls, the computing asset can be considered as minimizing its vulnerability to security breaches and/or exploitation. However, if a computing asset does not comply with stipulated controls, the computing asset can be considered as vulnerable and/or compromised in terms of data security.

Health-checks can be periodically performed (e.g., once every 24 hours) on a computing asset to determine whether the computing asset satisfies stipulated controls. Often, computing systems can be made up of many different computing assets, and the number of non-compliant controls can be so large as to overwhelm an operator of the computing system (e.g., many different computing assets can comply with and/or violate many different controls). In such case, different non-compliant controls of different computing assets can pose different risks, and the operator of the computing system can be unsure of how to triage the non-compliant controls (e.g., can be unsure which non-compliant controls are most pressing and/or least pressing so as to determine which non-compliant controls should be rectified first).

Conventionally, health-check risk assessment is performed to assign severity levels to non-compliant controls so that triage can be performed. For instance, health-check risk scores can be assigned to non-compliant controls via the Common Configuration Scoring System (CCSS). However, such conventional health-check risk assessment techniques are generally manual processes that are performed by human operators once or twice per year. Even when conventional health-check risk assessment techniques implement automation, they are based on subjective assessments of operators and are thus error prone and non-standardized (e.g., different operators might have different expertise, different experience levels, and/or different opinions as to which non-compliant controls of which computing assets pose more severe or less severe security threats).

Moreover, such conventional health-check risk assessment techniques do not take into account various important aspects of computing assets and non-compliant controls. Specifically, such conventional health-check risk assessment techniques consider controls only in binary fashion. That is, they determine only whether a control is satisfied or violated; they do not take into account the magnitude of non-compliance. This can be suboptimal since greater magnitudes of non-compliance can pose greater security risks (e.g., a password that is 6 months too old is a far greater security risk than a password that is one day too old; a password that is many characters too short is a far greater security risk than a password that is one character too short; privileges that have been shared with dozens of excess entities are a far greater security risk than privileges that have been shared with only one excess entity; audits that are performed 50% too infrequently are a far greater security risk than audits that are performed 5% too infrequently). Furthermore, such conventional health-check risk assessment techniques ignore importance levels of computing assets. This can be suboptimal since a more important computing asset that violates a stipulated control by a given magnitude can pose a far greater security risk than can a less important computing asset that violates the same control by the same magnitude (e.g., consider an online shopping account and a database storing sensitive/private data; although both the online shopping account and the database can each be protected by a corresponding password that is one month too old, the database can be considered as a more important and/or critical computing asset as compared to the online shopping account, and so the non-compliant database can pose far greater security risks than the non-compliant online shopping account). Further still, such conventional health-check risk assessment techniques take stipulated controls at face value and in no way compare such stipulated controls to recommended controls and/or to best practices in the industry. This can be suboptimal because a less mature (e.g., a less cybersecurity-savvy) organization can institute controls that significantly differ from industry standards (e.g., a company can stipulate that datacenter passwords must be no more than 180 days old, whereas best practices in the industry can recommend that datacenter passwords must be no more than 90 days old; accordingly, a datacenter password that is 120 days old can be considered as complying with the stipulated control but can nonetheless pose a significant security risk since the stipulated control is significantly less stringent than the recommended control). Moreover, such conventional health-check risk assessment techniques are generally manually implemented (e.g., they rely on subjective score assessments by human operators, and do not implement any form of artificial intelligence to enhance standardization). Thus, conventional health-check risk assessment techniques suffer from various technical problems.

Various embodiments of the invention can address one or more of these technical problems. Specifically, various embodiments of the invention can provide systems and/or techniques that can facilitate automated health-check risk assessment of computing assets. In other words, various embodiments of the invention can be considered as a computerized diagnostic tool (e.g., computer-implemented software) that can monitor compliance and/or non-compliance of a computing asset with one or more stipulated controls. In various aspects, such a computerized diagnostic tool can assign baseline health-check risk scores (e.g., CCSS scores) to various non-compliant controls of a computing asset, and can adjust such baseline health-check risk scores based on corresponding weakness factors (e.g., which can account for magnitude of non-compliance), environmental factors (e.g., which can account for built-in security mechanisms of a computing asset), criticality factors (e.g., which can account for an importance level of a computing asset), and/or maturity factors (e.g., which can account for deviations between stipulated controls and best practices and/or industry standards).

In various embodiments, such a computerized diagnostic tool can comprise a baseline component, a weakness component, an environment component, a criticality component, and/or a maturity component.

In various aspects, the computerized diagnostic tool can scan and/or query a computing asset to obtain state information regarding the computing asset. That is, any suitable electronic scanning, querying, and/or information-retrieval technique can be implemented to determine a state of the computing asset. In various instances, the state of the computing asset can be any suitable technical characteristic and/or property of the computing asset that is governed by and/or subject to a stipulated control. For example, the state of the computing asset can be an age of a password implemented by the computing asset, and the stipulated control can specify a maximum password age; the state of the computing asset can be a length of a password implemented by the computing asset, and the stipulated control can specify a minimum password length; the state of the computing asset can be a number of allowable sign-in attempts implemented by the computing asset, and the stipulated control can specify a maximum number of allowable sign-in attempts; the state of the computing asset can be an auditing frequency implemented by the computing asset, and the stipulated control can specify a minimum auditing frequency; and/or the state of the computing asset can be a capacity and/or file-count of a database maintained by the computing asset, and the stipulated control can specify a maximum capacity and/or file-count. In various aspects, the computerized diagnostic tool can learn of the stipulated control by any suitable technique (e.g., can query any suitable electronically accessible data source to learn the stipulated control, can be preprogrammed to already have and/or know the stipulated control, can receive the stipulated control as input from an operator and/or from any suitable electronic device).

In various instances, the baseline component of the computerized diagnostic tool can generate a baseline health-check risk score based on the state of the computing asset and the stipulated control. In various cases, any suitable risk scoring and/or risk quantification technique can be implemented to generate the baseline health-check risk score, such as CCSS techniques. In various aspects, the remaining components of the computerized diagnostic tool can adjust the baseline health-check risk score as described herein in order to make the baseline health-check risk score more accurate (e.g., in order to address above-mentioned shortcomings of CCSS techniques).

In various aspects, the weakness component can generate a scalar referred to as a weakness factor for the computing asset and/or for the stipulated control. In various cases, the value of the weakness factor can be a function of a difference (e.g., computed via subtraction) between the state of the computing asset and the stipulated control. As mentioned above, conventional health-check risk assessment techniques operate in a binary fashion, such that one risk score is assigned if a stipulated control is complied with, and a different risk score is assigned if the stipulated control is not complied with. In contrast, the weakness factor can, in various aspects, be based on a magnitude and/or a severity of non-compliance (e.g., can be based on how much and/or how badly the state of the computing asset fails to satisfy the stipulated control). If the state of the computing asset is merely slightly non-compliant with the stipulated control (e.g., if a password is merely one character too short, if a password is merely one day too old, if a datacenter is merely one file over capacity, and/or if privileges have been granted to merely one entity too many), the weakness factor can be commensurately small in value (e.g., indicating low risk). On the other hand, if the state of the computing asset is more severely non-compliant with the stipulated control (e.g., if a password is several characters too short, if a password is several weeks too old, if a datacenter is several files over capacity, and/or if privileges have been granted to many entities), the weakness factor can be commensurately large in value (e.g., indicating high risk). In various cases, the baseline health-check risk score can be mathematically adjusted (e.g., increased and/or decreased) based on the weakness factor. In this way, the computerized diagnostic tool can take into account a magnitude of non-compliance of the computing asset with the stipulated control. As used herein, the term "weakness factor" can mean a scalar (e.g., a number) the value of which is based on how non-compliant the computing asset is with a stipulated control. In other words, the difference between the state of the computing asset and the stipulated control can be computed via subtraction, and the value of the weakness factor can be based on such difference. In various cases, the value of the weakness factor can be any suitable mathematical function of such difference (e.g., the weakness factor can be computed by applying any suitable mathematical operations to the difference between the state of the computing asset and the stipulated control). The weakness factor can then be used to mathematically adjust (e.g., raise and/or lower) the baseline health-check risk score, as described herein (e.g., as explained with respect to FIG. 9).

In various instances, the weakness component can generate and/or compute the weakness factor based on the value of the state of the computing asset and based on the value of the stipulated control. In some cases, the weakness component can comprise a trained machine learning model which can be leveraged to generate/compute the weakness factor. In various aspects, the trained machine learning model can be any suitable computer-implemented artificial intelligence algorithm (e.g., neural network, linear regression, logistic regression, naïve Bayes, support vector machine, random forest) that is trainable to classify and/or label input data (e.g., trainable via supervised learning, unsupervised learning, and/or reinforcement learning). In various cases, the weakness component can be configured to electronically receive and/or retrieve from any suitable electronically accessible data structure one or more control documents (e.g., natural language documents) that describe various technical details of the stipulated control. Such control documents can, for example, include GitHub documents, development/design documents, and/or any other similar documents that describe and/or characterize the technical properties/characteristics of the stipulated control. In various cases, any other suitable input data that characterizes the stipulated control can be implemented. In various instances, the weakness component can generate a numerical representation (e.g., vector, tensor) of the one or more control documents (e.g., by applying any suitable word embedding techniques and/or language modeling techniques). In various cases, the trained machine learning model can then receive as input the numerical representation of the one or more control documents and can generate as output a classification and/or label associated with the stipulated control.

As explained in the above paragraph, the control documents can be natural language documents (e.g., written in human-readable text). However, the machine learning model of the weakness component may not normally receive human-readable text/prose as an input. Instead, any suitable word embedding technique can be implemented, which generates a numerical representation of the control documents. The "numerical representation" of the control documents can be a vector, tensor, and/or any other suitable collection of numbers that represents and/or is correlated to the content of the control documents (e.g., word embedding algorithms are configured to assign numerical values to human-readable words and/or sentences based on context of such human-readable words and/or sentences). The machine learning model of the weakness component can then receive the numerical representation and can generate a classification/label as described herein. Word embedding techniques can be natural language processing algorithms that are configured to map human-readable words or phrases in a given vocabulary to vectors and/or tensors of real numbers having any suitable dimensionality. More specifically, word embeddings leverage the principle that words that generally appear near each other in a document have similar meanings. Thus, a word embedding can assign to a particular word (and/or a phrase) in a control document an n-dimensional vector, for any suitable integer n, where the values of the n-dimensional vector are based on the other words that appear near the particular word. Similar words can thus have similar vectors, and dissimilar words can thus have dissimilar vectors. As those having ordinary skill in the art will appreciate, word embedding techniques can be facilitated via trained neural networks and/or via dimensionality reduction of a word co-occurrence matrix that corresponds to the inputted control documents. Note that these are mere examples of word embedding techniques and that, in various embodiments, any suitable word embedding technique can be implemented. Word embedding techniques and the numerical representations that they generate are known in the art, and additional detail regarding word embedding techniques and the numerical representations that they generate need not be set forth herein.

In various aspects, the classification and/or label generated by the machine learning model of the weakness component can identify a weakness category to which the stipulated control belongs based on the one or more control documents describing the stipulated control. For instance, the stipulated control can be classified and/or labeled as pertaining to passive weaknesses, direct active weakness, and/or indirect active weaknesses. In various cases, the stipulated control can pertain to a passive weakness (e.g., can be a passive control) if, for example, non-compliance with the stipulated control can enable an attacker to prevent the computing asset from performing authorized actions (e.g., to prevent the computing asset from performing security audits, to prevent the computing asset from administering Completely Automated Public Turing tests to tell Computers and Humans Apart (CAPTCHA tests), to prevent the computing asset from initiating automated security protocols, to prevent the computing asset from executing some system service or daemon). A passive weakness may not be actively exploited by an attacker, but it may prevent an attacker's unauthorized actions from being detected. In various instances, the stipulated control can pertain to an active weakness (e.g., can be an active control) if, for example, non-compliance with the stipulated control can enable an attacker to perform unauthorized actions (e.g., to gain access to and/or read sensitive/private data, to make copies of sensitive/private data, to edit sensitive/private data, to upload and/or store malware and/or spyware). In various cases, the stipulated control can pertain to a direct active weakness (e.g., can be a direct active control) if, for example, it pertains to an active weakness and an exploit of the stipulated control is known to already exist (e.g., installing in the computing asset an outdated vulnerability for which there is a known exploit can enable an attacker to immediately attack the computing asset). In contrast, the stipulated control can pertain to an indirect active weakness (e.g., can be an indirect active control) if, for example, it pertains to an active weakness and an exploit of the stipulated control is not known to already exist (e.g., implementing a weak password in the computing asset does not necessarily allow an attacker to immediately attack the computing asset, but it can present an opportunity to the attacker to take advantage). In various aspects, the trained machine learning model can determine to which weakness category the stipulated control belongs (e.g., can determine whether the stipulated control is a passive control, a direct active control, or an indirect active control) and can then assign a weakness factor based on the weakness category. For instance, if the stipulated control belongs to the passive weakness category, the weakness factor can have a low value (e.g., passive weaknesses can be considered as not being very weak). If the stipulated control belongs to the direct active weakness category, the weakness factor can have a high value (e.g., direct active weaknesses can be considered as being unacceptably weak). If the stipulated control belongs to the indirect active weakness category, the weakness factor can have a value that depends on the magnitude of the non-compliance (e.g., the value of the weakness factor can be proportional to how much the state of the computing asset violates the stipulated control, and can be bounded below by the value associated with passive weaknesses and bounded above by the value associated with direct active weaknesses). In various embodiments, any other suitable weakness categories can be implemented. In other words, the weakness component can receive technical documentation that describes properties of the stipulated control, the trained machine learning model can classify the stipulated control into a weakness category based on the technical documentation, the value of the weakness factor can vary for different weakness categories, and the value of the weakness factor for some weakness categories can be based on how non-compliant the computing asset is with the stipulated control.

As explained in the above paragraph, the machine learning model of the weakness component can determine the weakness category of the stipulated control and can then assign a value to the weakness factor based on the type of weakness category that is determined. Although the above-described embodiments mention only passive weaknesses, direct active weaknesses, and indirect active weaknesses, these are mere examples and are non-limiting. In various embodiments, any other suitable weakness categories can be implemented. The above paragraph defines "passive weaknesses," direct active weaknesses," and "indirect active weaknesses." In one or more embodiments, the definition of a passive weakness (or a passive control) can be a weakness or control in which non-compliance allows an attacker to prevent authorized actions (e.g., automated security audits) by the system. In one or more embodiments, the definition of an active weakness (or an active control) can be a weakness or control in which non-compliance allows an attacker to perform unauthorized actions (e.g., reading/editing data). In one or more embodiments, the definition of a "direct active weakness" can be an active weakness for which an exploit (e.g., malicious computer software that takes advantage of a computer bug or vulnerability) is already known in the industry/field to exist (e.g., immediately exploitable). In some aspects, the weakness component can be preprogrammed with (and/or can otherwise have any suitable form of access to) a list of exploits known to exist at any suitable time in the industry/field. In one or more embodiments, the definition of an "indirect active weakness" can be an active weakness for which an exploit is not already known in the industry/field to exist (e.g., not necessarily immediately exploitable).

In various instances, the environment component can generate a scalar referred to as an environmental factor for the computing asset and/or for the stipulated control. In various cases, the value of the environmental factor can be a function of various security mechanisms and/or security protocols that are implemented by the computing asset to guard against security threats. For instance, if the computing asset implements advanced and/or rigorous protection mechanisms (e.g., data masking/encryption rather than automatic data discovery/classification, anomaly prevention/interception rather than anomaly detection, internal-only access rather than public access), the environmental factor can be commensurately small in value (e.g., indicating low risk). On the other hand, if the computing asset implements less advanced and/or less rigorous protection mechanisms (e.g., automatic data discovery/classification rather than data masking/encryption, mere anomaly detection rather than anomaly prevention/interception, public access rather than internal-only access), the environmental factor can be commensurately large in value (e.g., indicating high risk). In various cases, the baseline health-check risk score can be mathematically adjusted (e.g., increased and/or decreased) based on the environmental factor. In this way, the computerized diagnostic tool can take into account built-in security mechanisms of the computing asset that can make the computing asset inherently less susceptible to security attacks. As used herein, the term "environmental factor" can mean a scalar (e.g., a number) the value of which is based on properties of the computing asset (e.g., based on how many and/or what types of security mechanisms are implemented by the computing asset). In various cases, the value of the environmental factor can be any suitable mathematical function of such properties of the computing asset. The environmental factor can then be used to mathematically adjust (e.g., raise and/or lower) the baseline health-check risk score, as described herein (e.g., as explained with respect to FIG. 9).

In various instances, the environment component can generate and/or compute the environmental factor based on various security/privacy policies implemented by the computing asset. In some cases, the environment component can comprise a trained machine learning model which can be leveraged to generate/compute the environmental factor. As mentioned above, the trained machine learning model can be any suitable computer-implemented artificial intelligence algorithm that is trainable to classify and/or label input data. In various cases, the environment component can be configured to electronically receive and/or retrieve from any suitable electronically accessible data structure one or more asset documents (e.g., natural language documents) that describe various technical details of the computing asset. Such asset documents can, for example, include GitHub documents, development/design documents, and/or any other similar documents that describe and/or characterize the technical properties/characteristics of the computing asset. In various cases, any other suitable input data that characterizes technical properties of the computing asset can be implemented. Similar to the weakness component, the environment component can generate a numerical representation (e.g., vector, tensor) of the one or more asset documents (e.g., via word embedding and/or language modeling). In various cases, the trained machine learning model of the environment component can then receive as input the numerical representation of the one or more asset documents and can generate as output various determinations associated with the computing asset.

As explained in the above paragraph, the asset documents can be natural language documents (e.g., written in human-readable text). However, the machine learning model of the environment component may not normally receive human-readable text/prose as an input. Instead, any suitable word embedding technique can be implemented, which generates a numerical representation of the asset documents. The "numerical representation" of the asset documents can be a vector, tensor, and/or any other suitable collection of numbers that represents and/or is correlated to the content of the asset documents (e.g., word embedding algorithms are configured to assign numerical values to human-readable words and/or sentences based on context of such human-readable words and/or sentences). The machine learning model of the environment component can then receive the numerical representation and can generate various determinations as described herein. Word embedding techniques can be natural language processing algorithms that are configured to map human-readable words or phrases in a given vocabulary to vectors and/or tensors of real numbers having any suitable dimensionality. More specifically, word embeddings leverage the principle that words that generally appear near each other in a document have similar meanings. Thus, a word embedding can assign to a particular word (and/or a phrase) in an asset document an n-dimensional vector, for any suitable integer n, where the values of the n-dimensional vector are based on the other words that appear near the particular word. Similar words can thus have similar vectors, and dissimilar words can thus have dissimilar vectors. As those having ordinary skill in the art will appreciate, word embedding techniques can be facilitated via trained neural networks and/or via dimensionality reduction of a word co-occurrence matrix that corresponds to the inputted asset documents. Note that these are mere examples of word embedding techniques and that, in various embodiments, any suitable word embedding technique can be implemented. Word embedding techniques and the numerical representations that they generate are known in the art, and additional detail regarding word embedding techniques and the numerical representations that they generate need not be set forth herein.

In various aspects, the determinations of the machine learning model of the environment component can identify various technical aspects and/or technical properties of the computing asset based on the one or more asset documents describing the computing asset. In some cases, the determinations can identify a type of access protocol implemented by the computing asset (e.g., can determine whether the computing asset is only internally accessible (less risky) or whether the computing asset is publicly accessible (more risky)). In some cases, the determinations can identify a type of modification paradigm implemented by the computing asset (e.g., can determine whether the computing asset is immutable (less risky) or whether the computing asset is mutable/ephemeral (more risky)). In some cases, the determinations can identify a type of instantiation paradigm implemented by the computing asset (e.g., can determine whether the computing asset is isolated (less risky) or whether the computing asset is configured as multi-tenancy (more risky)). In some cases, the determinations can identify a type of service availability associated with the computing asset (e.g., whether servicing and/or maintenance is still available for the computing asset (less risky) or whether servicing/maintenance is no longer available for the computing asset (more risky)). In some cases, the determinations can identify a data protection protocol implemented by the computing asset (e.g., can determine whether the computing asset automatically implements data masking/encryption even for signed-in entities (less risky) or whether the computing asset automatically implements data discovery/classification for signed-in entities (more risky)). In some cases, the determinations can identify a type of compliance enforcement implemented by the computing asset (e.g., can determine whether controls are regularly inspected and remedied (less risky) or whether controls are merely regularly inspected (more risky)). In some cases, the determinations can identify a type of anomaly detection implemented by the computing asset (e.g., can determine whether the computing asset automatically prevents and/or impedes unusual behavior (less risky) or whether the computing asset merely notifies when unusual behavior is detected (more risky)). In some cases, the determinations can identify any other suitable characteristic of the computing asset. In various cases, the trained machine learning model of the environment component can assign a value to the environmental factor based on these determinations. Specifically, the environmental factor can be lower when the trained machine learning classifier determines that the computing asset incorporates more rigorous and/or advanced security mechanisms (e.g., in such case, the computing asset can be considered as a hardened target that is more resistant to exploitation notwithstanding non-compliance with a stipulated control; thus, the computing asset can pose a lower security risk). On the other hand, the environmental factor can be higher when the trained machine learning model determines that the computing asset incorporates less rigorous and/or advanced security mechanisms (e.g., in such case, the computing asset can be considered as a softened target that is less resistant to exploitation; thus, the computing asset can be considered as especially at risk in the presence of a non-compliant control). In other words, the environment component can receive technical documentation that describes properties of the computing asset, the trained machine learning model of the environment component can determine what security mechanisms are implemented by the computing asset based on the technical documentation, and the value of the environmental factor can be based on such security mechanisms/protocols.

In various instances, the criticality component can generate a scalar referred to as a criticality factor for the computing asset and/or for the stipulated control. In various cases, the value of the criticality factor can be a function of a level of importance of the computing asset to an entity that owns and/or operates the computing asset. For instance, if the computing asset is highly important to the entity that owns/operates the computing asset (e.g., a banking institution can have a computing application that transfers funds into and/or out of client accounts, and such a computing application can be critically important to the banking institution), the criticality factor can be commensurately large in value (e.g., indicating high risk). On the other hand, if the computing asset is less important to the entity that owns/operates the computing asset (e.g., a banking institution can have a website dedicated to advertisements and/or outreach, and the website may not be critically important to the banking institution), the criticality factor can be commensurately small in value (e.g., indicating low risk). In various cases, the baseline health-check risk score can be mathematically adjusted (e.g., increased and/or decreased) based on the criticality factor. In this way, the computerized diagnostic tool can take into account how important the computing asset is to the entity that owns/operates the computing asset. As used herein, the term "criticality factor" can mean a scalar (e.g., a number) the value of which is based on a level of importance of the computing asset. In various cases, the value of the criticality factor can be any suitable mathematical function of such level of importance of the computing asset (e.g., the criticality factor can be computed by applying any suitable mathematical operations to the level of importance of the computing asset). The criticality factor can then be used to mathematically adjust (e.g., raise and/or lower) the baseline health-check risk score, as described herein (e.g., as explained with respect to FIG. 9).

In various instances, the criticality component can generate and/or compute the criticality factor based on electronic input received by the entity that owns/operates the computing asset. In other cases, the criticality component can comprise a trained machine learning model which can be leveraged to generate/compute the criticality factor. As mentioned above, the trained machine learning model can be any suitable computer-implemented artificial intelligence algorithm that is trainable to classify and/or label input data. In various cases, the criticality component can be configured to electronically receive and/or retrieve from any suitable electronically accessible data structure one or more documents (e.g., natural language documents) that describe various details of the computing asset and/or various goals/purposes of the entity that owns/operates the computing asset. Such documents can, for example, include advertisements, business plans/presentations, mission statements, non-technical descriptions, and/or any other similar documents that describe/characterize the goals of the entity that owns/operates the computing asset and/or that describe/characterize how the computing asset is utilized by the entity that owns/operates the computing asset. In various cases, any other suitable input data that characterizes the computing asset and/or the goals/activities of the entity that owns/operates the computing asset can be implemented. Similar to the weakness component and/or the environment component, the criticality component can generate a numerical representation (e.g., vector, tensor) of the one or more documents (e.g., via word embedding and/or language modeling). In various cases, the trained machine learning model of the criticality component can then receive as input the numerical representation of the one or more documents and can generate as output a classification and/or label associated with the computing asset. In various aspects, the classification and/or label can identify how important the computing asset is to the entity that owns/operates the computing asset (e.g., can identify how critical the computing asset is to the commercial activities and/or purposes/goals of the entity). For instance, the classification and/or label can be non-critical (e.g., indicating that the computing asset is not an incredibly important aspect of the activities/goals of the entity that owns/operates the computing asset), the classification and/or label can be critical (e.g., indicating that the computing asset is an important aspect of the activities/goals of the entity that owns/operates the computing asset), and/or the classification and/or label can be hyper-critical (e.g., indicating that the computing asset is an incredibly important aspect of the activities/goals of the entity that owns/operates the computing asset).

As explained in the above paragraph, the documents can be natural language documents (e.g., written in human-readable text). However, the machine learning model of the criticality component may not normally receive human-readable text/prose as an input. Instead, any suitable word embedding technique can be implemented, which generates a numerical representation of the documents. The "numerical representation" of the documents can be a vector, tensor, and/or any other suitable collection of numbers that represents and/or is correlated to the content of the documents (e.g., word embedding algorithms are configured to assign numerical values to human-readable words and/or sentences based on context of such human-readable words and/or sentences). The machine learning model of the criticality component can then receive the numerical representation and can generate a classification/label as described herein. Word embedding techniques can be natural language processing algorithms that are configured to map human-readable words or phrases in a given vocabulary to vectors and/or tensors of real numbers having any suitable dimensionality. More specifically, word embeddings leverage the principle that words that generally appear near each other in a document have similar meanings. Thus, a word embedding can assign to a particular word (and/or a phrase) in a document an n-dimensional vector, for any suitable integer n, where the values of the n-dimensional vector are based on the other words that appear near the particular word. Similar words can thus have similar vectors, and dissimilar words can thus have dissimilar vectors. As those having ordinary skill in the art will appreciate, word embedding techniques can be facilitated via trained neural networks and/or via dimensionality reduction of a word co-occurrence matrix that corresponds to the inputted documents. Note that these are mere examples of word embedding techniques and that, in various embodiments, any suitable word embedding technique can be implemented. Word embedding techniques and the numerical representations that they generate are known in the art, and additional detail regarding word embedding techniques and the numerical representations that they generate need not be set forth herein.

In various cases, the trained machine learning model of the criticality component can assign a value to the criticality factor based on the classification and/or label. Specifically, the criticality factor can be low when the trained machine learning classifier determines that the computing asset is not critical (e.g., non-compliance with a stipulated control can pose a low security risk since the computing asset is not very important), the criticality factor can be higher when the trained machine learning classifier determines that the computing asset is critical (e.g., non-compliance with a stipulated control can pose a moderate security risk since the computing asset is important), and the criticality factor can be highest when the trained machine learning classifier determines that the computing asset is hyper-critical (e.g., non-compliance with a stipulated control can pose a high security risk since the computing asset is very important). In other words, the criticality component can receive documentation that describes properties of the computing asset and/or that describes goals/purposes of the entity that owns/operates the computing asset, the trained machine learning model of the criticality component can determine a level of importance and/or criticality to assign to the computing asset based on the documentation, and the value of the criticality factor can be based on such level of importance and/or criticality.

In various instances, the maturity component can generate a scalar referred to as a maturity factor for the computing asset and/or for the stipulated control. In various cases, the value of the maturity factor can be a function of a difference (e.g., computed via subtraction) and/or deviation between the stipulated control and industry standards/best practices. For instance, an entity that owns/operates the computing asset might establish stipulated controls that are more lax and/or less stringent than industry standards and/or best practices that are recommended for the computing asset. In such case, the entity that owns/operates the computing asset can be considered as less mature from a cybersecurity perspective. In various aspects, it is thus possible for a computing asset to comply with a stipulated control and to nevertheless pose a security risk since the stipulated control is more lax and/or less secure than industry standards and/or recommendations. Moreover, it is also possible for a computing asset to only slightly fail to comply with a stipulated control and to nevertheless pose a significant security risk since the stipulated control is more lax and/or less secure than industry standards and/or recommendations. As an example, suppose that a stipulated control specifies that passwords in a computing asset are to be at least 4 characters long, and suppose that industry standards and/or industry best practices instead recommend that passwords in such a computing asset are to be at least 10 characters long. In such case, a password that is six characters long can be considered as compliant with the stipulated control, but it can still pose a security threat because the stipulated control is much less stringent than industry standards (e.g., 4-character passwords are inherently less secure than 10-character passwords). Moreover, if a password of the computing asset is only three characters long, it can be considered as only slightly non-compliant with the stipulated control. Nevertheless, such a three-character password can pose a significant security threat since the stipulated control is much less stringent than industry standards. Thus, in various embodiments, the maturity component can generate a value of the maturity factor based on how different the stipulated control is as compared to a recommended control, a best practice, and/or an industry standard. In various cases, the baseline health-check risk score can be mathematically adjusted (e.g., increased and/or decreased) based on the maturity factor. In this way, the computerized diagnostic tool can take into account how mature in a cybersecurity sense the entity that owns/operates the computing asset is. As used herein, the term "maturity factor" can mean a scalar (e.g., a number) the value of which is based on a difference (e.g., computed via subtraction) between the stipulated control and a recommended control (e.g., best practices). In various cases, the value of the maturity factor can be any suitable mathematical function of such difference (e.g., the maturity factor can be computed by applying any suitable mathematical operations to the difference between the stipulated control and the recommended control). The maturity factor can then be used to mathematically adjust (e.g., raise and/or lower) the baseline health-check risk score, as described herein (e.g., as explained with respect to FIG. 9).

In various instances, the maturity component can generate and/or compute the maturity factor based on electronic input received by the entity that owns/operates the computing asset. In other cases, the maturity component can query any suitable data structure that is electronically accessible to the maturity component to learn best practices, industry standards, and/or industry recommendations that are associated with the stipulated control. In such cases, the maturity component can then compare the retrieved value specified by the best practice, industry standard, and/or industry recommendation with the value specified by the stipulated control in order to determine how much more lax and/or how much less stringent/secure the stipulated control is as compared to the best practice, industry standard, and/or industry recommendation. In various cases, the value of the maturity factor can be set accordingly. Specifically, the maturity factor can be low if the maturity component determines that the stipulated control is consistent with (e.g., within a predetermined margin of) the recommended control, the maturity factor can be even lower if the maturity component determines that the stipulated control is more stringent than the recommended control, the maturity factor can be high if the maturity component determines that the stipulated control is more lax and/or less stringent than the recommended control by a particular proportion, and the maturity factor can be even higher when the maturity component determines that the stipulated control is more lax and/or less stringent that the recommended control by an even larger proportion. In other words, the maturity component can be informed of a recommended control that relates to the computing asset, the maturity component can determine a difference and/or deviation between the stipulated control and the recommended control, and the value of the maturity factor can be based on such level difference and/or deviation.

As described above, the computerized diagnostic tool can generate the baseline health-check risk score, the weakness factor, the environmental factor, the criticality factor, and/or the maturity factor, based on the state of the computing asset and the stipulated control. In various cases, the computerized diagnostic tool can adjust the baseline health-check risk score based on the weakness factor, the environmental factor, the criticality factor, and/or the maturity factor. In some cases, the computerized diagnostic tool can multiply the baseline health-check risk score by the environmental factor to yield a first product, can add the weakness factor to the first product to yield a first sum, can multiply the criticality factor by the first sum to yield a second product, and can multiply the maturity factor by the second product to yield an adjusted health-check risk score for the computing asset based on the stipulated control. This is merely one example of how an adjusted health-check risk score for the computing asset can be computed based on the baseline health-check risk score, the weakness factor, the environmental factor, the criticality factor, and/or the maturity factor. In other cases, any other suitable equations, formulas, and/or mathematical operations can be performed on the baseline health-check risk score, the weakness factor, the environmental factor, the criticality factor, and/or the maturity factor in order to compute an adjusted health-check risk score for the computing asset (e.g., can add the environmental factor rather than multiply by it; can multiply by the weakness factor rather than add it; can add the criticality factor rather than multiply by it; can add the maturity factor rather than multiply by it). In various cases, the adjusted health-check risk score can quantify a level of security risk associated with the computing asset due to the computing asset's non-compliance with the stipulated control. As explained above, the adjusted health-check risk score can be more accurate than the baseline health-check risk score (e.g., generated via CCSS techniques) due to the weakness factor (e.g., which can account for magnitude of non-compliance of the computing asset), the environmental factor (e.g., which can account for built-in security mechanisms of the computing asset), the criticality factor (e.g., which can account for an importance level of the computing asset), and the maturity factor (e.g., which can account for differences between the stipulated control and best practices).

In various instances, a single computing asset can be subject to and/or governed by many different stipulated controls. So, in various embodiments, the computerized diagnostic tool can generate many different adjusted health-check risk scores for a single computing asset based on the many different stipulated controls that govern the single computing asset (e.g., one adjusted health-check risk score for each stipulated control that governs the computing asset). In various cases, the computerized diagnostic tool can comprise an aggregation component that can aggregate together these many different adjusted health-check risk scores (e.g., via weighted averages and/or via max-functions), thereby yielding an aggregate adjusted health-check risk score for the computing asset (e.g., one score for the computing asset that is aggregated over all the many different stipulated controls that govern the computing asset). Similarly, a computing system can be comprised of many different computing assets. So, the aggregation component can generate an aggregate adjusted health-check risk score for each computing asset, and can aggregate them together (e.g., via weighted averages and/or max-functions), thereby yielding a final adjusted health-check risk score for the entire computing system. In this way, the computerized diagnostic tool can quantify a level of risk associated with a computing system, can quantify separate levels of risk for each computing asset of the computing system, and/or can quantify even more granular levels of risk for each stipulated control of each computing asset of the computing system. Thus, triage between the computing assets and/or between stipulated controls of a single computing asset can be accurately performed.

In various aspects, the computerized diagnostic tool can generate any suitable electronic notifications and/or alerts based on the generated adjusted health-check risk scores (e.g., can inform and/or warn an entity that owns/operates the computing asset of an adjusted health-check risk score, can display adjusted health-check risk scores on an electronic screen/monitor). In various instances, the computerized diagnostic tool can take any suitable form of remedial action based on the adjusted health-check risk scores (e.g., can automatically lock and/or shut down a computing asset until non-compliant controls with adjusted health-check risk scores above a predetermined threshold are fixed, can automatically schedule and/or procure servicing/maintenance for the computing asset so as to fix non-compliant controls with adjusted health-check risk scores above a predetermined threshold).

Various embodiments of the invention can be employed to use hardware and/or software to solve problems that are highly technical in nature (e.g., to facilitate automated health-check risk assessment of computing assets), that are not abstract and that cannot be performed as a set of mental acts by a human. Further, some of the processes performed can be performed by a specialized computer (e.g.; generating, by a device operatively coupled to a processor, a baseline health-check risk score corresponding to non-compliance of a computing asset with a stipulated control; adjusting, by the device, the baseline health-check risk score based on a weakness factor of the stipulated control, wherein the weakness factor is based on a magnitude by which a state of the computing asset deviates from the stipulated control; adjusting, by the device, the baseline health-check risk score based on an environmental factor of the computing asset, wherein the environmental factor is based on security mechanisms or security protocols associated with the computing asset; adjusting, by the device, the baseline health-check risk score based on a criticality factor of the computing asset, wherein the criticality factor is based on a level of importance associated with the computing asset; and adjusting, by the device, the baseline health-check risk score based on a maturity factor of the computing asset, wherein the maturity factor is based on a difference between the stipulated control and a recommended control). Such defined tasks are not typically performed manually by humans. Moreover, neither the human mind nor a human with pen and paper can scan and/or query a computing asset for state information, can generate a baseline health-check risk score for the computing asset based on the state information and a stipulated control, can generate a weakness factor, environmental factor, criticality factor, and/or maturity factor for the computing asset, and can adjust the baseline health-check risk score based on the weakness factor, environmental factor, criticality factor, and/or maturity factor. Moreover, as explained herein, various embodiments of the invention can utilize machine learning models to aid in such generation and/or adjustment, and neither the human mind nor a human with pen and paper can electronically execute a machine learning model. Instead, various embodiments of the invention are inherently and inextricably tied to computer technology and cannot be implemented outside of a computing environment (e.g., computing assets are inherently computerized devices that cannot exist outside of computing systems; likewise, a computerized diagnostic tool that automatically monitors computing assets for compliance with stipulated controls is an inherently computerized device that also cannot exist outside of a computing system).

In various instances, embodiments of the invention can integrate into a practical application the disclosed teachings regarding automated health-check risk assessment of computing assets. Indeed, as described herein, various embodiments of the invention, which can take the form of systems and/or computer-implemented methods, can be considered as a computerized diagnostic tool that evaluates control information of a computing asset and assigns adjusted health-check risk scores to the computing asset based on such control information. More specifically, embodiments of the invention can assign health-check risk scores to computing assets, which health-check risk scores quantify how much of a security threat the computing asset poses. Such quantification is certainly a useful and practical application of computers, at least because it allows operators to triage and/or prioritize different computing assets and/or different non-compliant controls of a single computing asset (e.g., without such health-check risk scores, an operator would not know which non-compliant controls to address/remedy first) . Furthermore, as mentioned above, conventional techniques for assigning such health-check risk scores completely ignore magnitude of non-compliance, criticality of a given computing asset, and deviations between stipulated controls and industry standards/best practices. As explained herein, various embodiments of the invention can address these shortcomings via the weakness factor, the environmental factor, the criticality factor, and/or the maturity factor, with the result being that the adjusted baseline health-check risk scores generated by embodiments of the invention can be more accurate than conventionally generated baseline health-check risk scores. Systems and/or techniques that can generate health-check risk scores that are more accurate than conventionally generated baseline health-check risk scores clearly constitute a concrete and tangible technical improvement in the field of automated health-check risk assessment of computing assets.

Furthermore, various embodiments of the invention can control tangible, hardware-based, and/or software-based devices based on the disclosed teachings. For example, embodiments of the invention can generate adjusted health-check risk scores that quantify a security risk associated with a tangible computing asset (e.g., a server, a datacenter) that fails to comply with stipulated controls. In some cases, embodiments of the invention can generate electronic notifications and/or warnings based on such adjusted health-check risk scores (e.g., can transmit such electronic notifications/warnings to other tangible devices, can display such electronic notifications/warnings on tangible electronic screens/monitors). In some cases, various embodiments of the invention can take action based on such adjusted health-check risk scores. For example, embodiments of the invention can lock and/or power-down a tangible computing asset when an adjusted health-check risk score exceeds a predefined threshold (e.g., by transmitting a lock instruction/command and/or a power-down instruction/command to the tangible computing asset). As another example, embodiments of the invention can schedule and/or procure servicing/maintenance for the tangible computing asset when an adjusted health-check risk score exceeds a predefined threshold (e.g., by electronically contacting a tangible computing device associated with a service/maintenance entity). As yet another example, embodiments of the invention can set off any suitable visible and/or audible alarm when an adjusted health-check risk score exceeds a predefined threshold (e.g., by transmitting an appropriate instruction/command to a tangible alarm device that can produce the visible and/or audible alarm). In various aspects, embodiments of the invention can initiate and/or execute any other suitable type of protective and/or preventative action to safeguard the computing asset when an adjusted health-check risk score exceeds a predefined threshold. Thus, embodiments of the invention constitute a concrete and tangible technical improvement in the field of automated health-check risk assessment of computing assets.

It should be appreciated that the figures and the herein disclosure describe non-limiting examples of various embodiments of the invention.

FIG. 1 illustrates a block diagram of an example, non-limiting system 100 that can facilitate automated health-check risk assessment of computing assets in accordance with one or more embodiments described herein. As shown, a health-check risk assessment system 102 can have any suitable form of electronic communication (e.g., wired and/or wireless) with a computing asset 104.

In various cases, the computing asset 104 can be any suitable combination of computer hardware and/or computing software. For example, the computing asset 104 can be a computer, a software application, a website, a database, a file, a mobile device, and/or any other suitable information technology system. In various instances, the computing asset 104 can comprise a state 106 and can be governed by and/or subject to a stipulated control 108. In various aspects, the state 106 can be any suitable technical property/characteristic of the computing asset 104, and the stipulated control 108 can be any suitable rule, regulation, benchmark, and/or standard that the state 106 is supposed to satisfy. As some non-limiting examples, the state 106 can be a password length (e.g., the actual character length of a password that is actually implemented by the computing asset 104), and the stipulated control 108 can be a minimum acceptable password length; the state 106 can be a password age (e.g., the actual age of a password that is actually implemented by the computing asset 104), and the stipulated control 108 can be a maximum acceptable password age; the state 106 can be a database file-count (e.g., the actual number of files stored in a database that is actually maintained by the computing asset 104), and the stipulated control 108 can be a maximum acceptable database file-count; and/or the state 106 can be an auditing frequency (e.g., the actual auditing frequency that is actually implemented by the computing asset 104), and the stipulated control 108 can be a minimum acceptable auditing frequency.

Although FIG. 1 depicts the stipulated control 108 as being within the computing asset 104, this is a non-limiting example presented for illustrative convenience. In various cases, the computing asset 104 may not know and/or may not have access to the stipulated control 108. Although FIG. 1 depicts the computing asset 104 as having only one state 106 and being governed by only one stipulated control 108, this is a non-limiting example. In various aspects, the computing asset 104 can have any suitable number of states and can be governed by any suitable number of stipulated controls.

In various instances, the state 106 can violate and/or can be non-compliant with the stipulated control 108. In various cases, the health-check risk assessment system 102 can quantify a level of security risk associated with such non-compliance, as explained below.

In various embodiments, the health-check risk assessment system 102 can comprise a processor 110 (e.g., computer processing unit, microprocessor) and a computer-readable memory 112 that is operably connected to the processor 110. The memory 112 can store computer-executable instructions which, upon execution by the processor 110, can cause the processor 110 and/or other components of the health-check risk assessment system 102 (e.g., baseline component 114, weakness component 116, environment component 118, criticality component 120, maturity component 122) to perform one or more acts. In various embodiments, the memory 112 can store computer-executable components (e.g., baseline component 114, weakness component 116, environment component 118, criticality component 120, maturity component 122), and the processor 110 can execute the computer-executable components.

In various embodiments, the health-check risk assessment system 102 can scan and/or query via any suitable technique the computing asset 104 for the state 106. That is, the health-check risk assessment system 102 can electronically retrieve the state 106 (e.g., a value of the state 106) from the computing asset 104. In various embodiments, the health-check risk assessment system 102 can learn the stipulated control 108 via any suitable technique. For instance, the health-check risk assessment system 102 can electronically retrieve the stipulated control 108 from any suitable data structure and/or data source that is accessible to the health-check risk assessment system 102 (e.g., again, although FIG. 1 depicts the stipulated control 108 as being within the computing asset 104, this is non-limiting; in some cases, the stipulated control 108 can be stored within a data structure (not shown) that is remote from the computing asset 104). In some cases, the health-check risk assessment system 102 can be preprogrammed to already know the stipulated control 108 and/or can electronically receive the stipulated control 108 as input from an operator. In any case, the health-check risk assessment system 102 can come to know both the state 106 and the stipulated control 108.

In various embodiments, the health-check risk assessment system 102 can comprise a baseline component 114. In various aspects, the baseline component 114 can generate a baseline health-check risk score based on the state 106 and/or the stipulated control 108. In various aspects, the baseline component 114 can implement any suitable risk quantification techniques to generate the baseline health-check risk score, such as CCSS techniques (e.g., including attack vectors, access complexities, authentication metrics, confidentiality impacts, integrity impacts, and/or availability impacts). However, as mentioned above, such risk quantification techniques can be suboptimal because they can fail to take into account various details, such as magnitude of non-compliance, criticality of the computing asset 104, and/or deviations between the stipulated control 108 and a corresponding recommended control (e.g., an industry standard and/or best practice). The health-check risk assessment system 102 can address these concerns by mathematically adjusting the baseline health-check risk score according to a weakness factor, an environmental factor, a criticality factor, and/or a maturity factor.

In various embodiments, the health-check risk assessment system 102 can comprise a weakness component 116. In various aspects, the weakness component 116 can generate and/or calculate a weakness factor, which can be based on a magnitude of by which the state 106 violates the stipulated control 108. For example, suppose that the state 106 is a password age and the stipulated control 108 is a maximum acceptable password age. If the state 106 is only slightly non-compliant with the stipulated control 108 (e.g., if the state 106 is 91 days and the stipulated control 108 is 90 days), the weakness factor can be numerically small (e.g., proportional to and/or otherwise a function of the percentage difference between the state 106 and the stipulated control 108), which can indicate a low security risk. On the other hand, if the state 106 is severely non-compliant with the stipulated control 108 (e.g., if the state 106 is 150 days and the stipulated control 108 is 90 days), the weakness factor can be numerically large (e.g., proportional to the percentage difference between the state 106 and the stipulated control 108), which can indicate a high security risk. As explained more herein, the weakness component 116 can, in some cases, generate the weakness factor via machine learning techniques.

In various embodiments, the health-check risk assessment system 102 can comprise an environment component 118. In various aspects, the environment component 118 can generate and/or calculate an environmental factor, which can be based on built-in security mechanisms that are implemented by the computing asset 104. For example, if the computing asset 104 implements effective and/or rigorous security/ privacy mechanisms (e.g., data masking/encryption even for signed-in entities, automated interception of anomalous behavior such as locking the computing asset 104 after a maximum number of sign-in attempts, internal-only accessibility), the environmental factor can be numerically small (e.g., indicating that the computing asset 104 is a hardened target that is resistant to exploitation notwithstanding failing to comply with the stipulated control 108). On the other hand, if the computing asset 104 implements ineffective and/or non-rigorous security/privacy mechanisms (e.g., automatic data discovery/classification for signed-in entities, mere notification of anomalous behavior, public accessibility), the environmental factor can be numerically large (e.g., indicating that the computing asset 104 is a softened target that is not very resistant to exploitation, which heightens security risks associated with not complying with the stipulated control 108). As explained more herein, the environment component 118 can, in some cases, generate the environmental factor via machine learning techniques.

In various embodiments, the health-check risk assessment system 102 can comprise a criticality component 120. In various aspects, the criticality component 120 can generate and/or calculate a criticality factor, which can be based on a level of importance of the computing asset 104. Suppose that the computing asset 104 is a software application employed by a financial institution and that electronically facilitates the actual purchase and/or sale of commercial stocks. Since such a software application is critical to the purposes/goals/ activities of the financial institution, the criticality factor can be large in value (e.g., because the software application is so important to the financial institution, non-compliance with the stipulated control 108 can pose an especially high security risk). On the other hand, suppose that the computing asset 104 is a website employed by the financial institution and that displays advertisement materials. Since such a website is not critical to the purposes/goals/activities of the financial institution, the criticality factor can be small in value (e.g., because the website is not so important to the financial institution, non-compliance with the stipulated control 108 can be not especially concerning). As explained more herein, the criticality component 120 can, in some cases, generate the criticality factor via machine learning techniques.

In various embodiments, the health-check risk assessment system 102 can comprise a maturity component 122. In various aspects, the maturity component 122 can generate and/or calculate a maturity factor, which can be based on a difference and/or deviation between the stipulated control 108 and a recommended control (e.g., a best practice and/or industry standard). For example, suppose the stipulated control 108 specifies a maximum acceptable password age of 90 days and that the recommended control specifies a maximum acceptable password age of 60 days. In such case, the stipulated control 108 is more lax and/or less stringent than the recommended control. Thus, even if the state 106 complies with the stipulated control 108, the state 106 can still pose a significant security risk. For example, if the state 106 is an actual password age of 80 days, the state 106 satisfies the stipulated control 108 which specifies a maximum acceptable password age of 90 days, however, because the stipulated control 108 is not consistent with the recommended control, which specifies a maximum acceptable password age of 60 days, the state 106 can be objectively unsecure.

In various cases, the health-check risk assessment system 102 can comprise an adjustment component 124. In various aspects, the adjustment component 124 can mathematically adjust the baseline health-check risk score using the weakness factor, the environmental factor, the criticality factor, and/or the maturity factor, thereby yielding an adjusted health-check risk score that is more accurate than the baseline health-check risk score.

Figure 2:
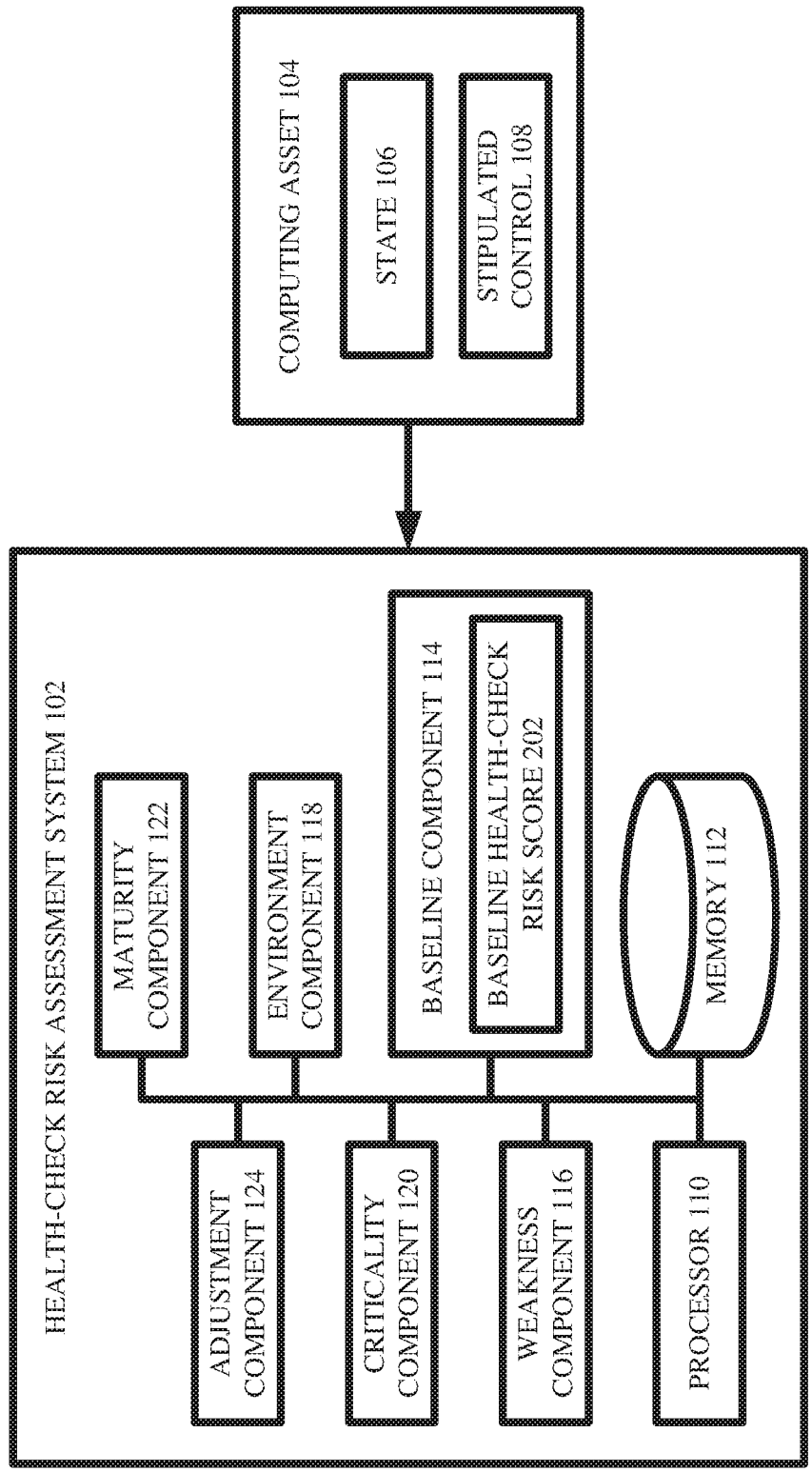
FIG. 2 illustrates a block diagram of an example, non-limiting system including a baseline health-check risk score that facilitates automated health-check risk assessment of computing assets in accordance with one or more embodiments described herein.

FIG. 2 illustrates a block diagram of an example, non-limiting system 200 including a baseline health-check risk score that can facilitate automated health-check risk assessment of computing assets in accordance with one or more embodiments described herein. As shown, the system 200 can, in some cases, comprise the same components as the system 100, and can further comprise a baseline health-check risk score 202.

As explained above, the baseline component 114 can generate and/or compute the baseline health-check risk score 202 based on the state 106 and/or the stipulated control 108 via any suitable health-check risk assessment technique (e.g., CCSS techniques). In various aspects, as described above, the baseline health-check risk score 202 can quantify a level of risk associated with non-compliance of the state 106 with the stipulated control 108 (e.g., higher values of the baseline health-check risk score 202 can indicate higher risk levels). However, the baseline health-check risk score 202 can be suboptimal and/or not fully accurate, at least because CCSS techniques fail to account for magnitude of non-compliance (e.g., they binarily consider whether the state 106 violates the stipulated control 108, without regard to the severity and/or amount of violation), CCSS techniques fail to account for a level of importance of the computing asset 104 (e.g., they consider two different computing assets to pose equal levels of risk if they violate the same stipulated controls, without regard to how important each asset is), and CCSS techniques fail to account for a difference between the stipulated control 108 and a recommended control (e.g., they take the stipulated control 108 at face value, even if the stipulated control 108 is significantly less stringent than industry standards). As explained herein, the health-check risk assessment system 102 can adjust the baseline health-check risk score 202 to address these shortcomings.

Figure 3:
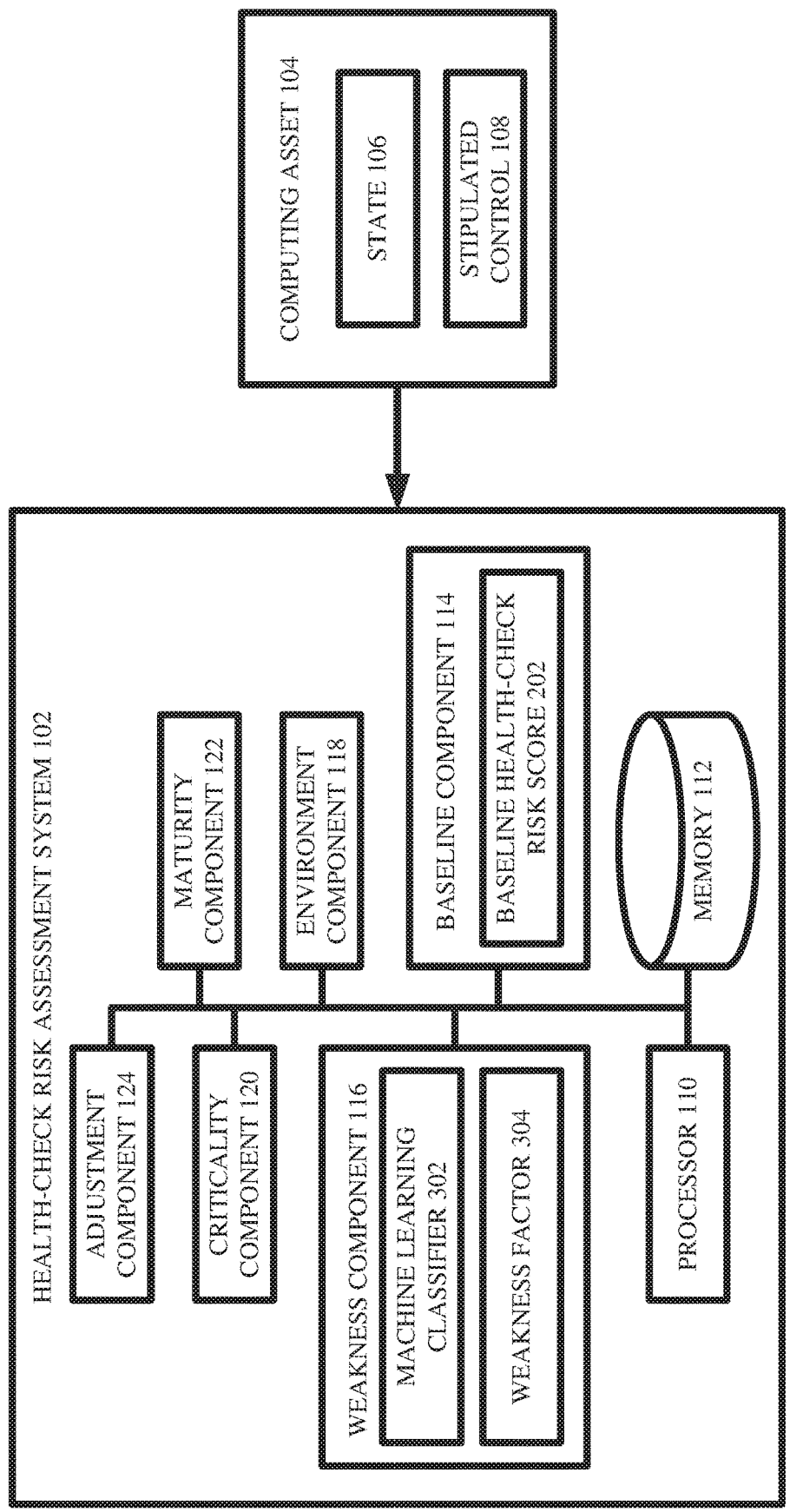
FIG. 3 illustrates a block diagram of an example, non-limiting system including a weakness factor that facilitates automated health-check risk assessment of computing assets in accordance with one or more embodiments described herein.

FIG. 3 illustrates a block diagram of an example, non-limiting system 300 including a weakness factor that can facilitate automated health-check risk assessment of computing assets in accordance with one or more embodiments described herein. As shown, the system 300 can, in some cases, comprise the same components as the system 200, and can further comprise a machine learning classifier 302 and a weakness factor 304.

In various embodiments, the machine learning classifier 302 can be any suitable computer-implemented artificial intelligence algorithm that can be trained to receive input information regarding the stipulated control 108 and to generate as output a weakness category to which the stipulated control 108 belongs. That is, the machine learning classifier 302 can determine whether the stipulated control 108 pertains to a passive weakness (e.g., can label the stipulated control 108 as a passive control), a direct active weakness (e.g., can label the stipulated control 108 as a direct active control), or an indirect active weakness (e.g., can label the stipulated control 108 as an indirect active control) Although not shown in the figures, in some aspects, the weakness component 116 can electronically receive and/or retrieve as input one or more control documents from any suitable electronically accessible data source. In various cases, the one or more control documents can be technical documentation that describes and/or characterizes properties, purposes, and/or details of the stipulated control 108 (e.g., GitHub documents, design/development documents). In various aspects, the one or more control documents can be written in any suitable natural language (e.g., any suitable human-readable text). In various instances, the weakness component 116 can generate a numerical representation, as described herein, of the one or more control documents by any suitable technique, such as word embedding and/or language modeling. In various cases, the machine learning classifier 302 can be trained to receive as input the numerical representation of the one or more control documents that describe the stipulated control 108 (e.g., the numerical representations can be considered as inputted feature vectors), and to determine as output a weakness category to which the stipulated control 108 belongs. In various aspects, the weakness component 116 can then generate the weakness factor 304 based on the weakness category determined by the machine learning classifier 302.

FIG. 4 illustrates an example, non-limiting table 400 associated with weakness factors in accordance with one or more embodiments described herein. In other words, table 400 shows brief descriptions of the various, non-limiting weakness categories with which the machine learning classifier 302 can be trained to label the stipulated control 108. As shown, the stipulated control 108 can be classified as pertaining to passive weaknesses or active weaknesses. In various cases, the stipulated control 108 can pertain to a passive weakness if failure to comply with the stipulated control 108 risks enabling an attacker to prevent the computing asset 104 from performing authorized actions, such as preventing the execution of a particular component and/or software application or preventing the generation of audit log records. In various aspects, the stipulated control 108 can pertain to an active weakness if failure to comply with the stipulated control 108 risks enabling an attacker to perform unauthorized actions, such as accessing, copying, and/or editing sensitive data. Moreover, in some cases, active weaknesses can be further bifurcated into direct active weaknesses and indirect active weaknesses. In various instances, a stipulated control 108 can pertain to a direct active weakness if it pertains to an active weakness and if an exploit of the stipulated control 108 is known to already exist. On the other hand, a stipulated control 108 can pertain to an indirect active weakness if it pertains to an active weakness and if an exploit of the stipulated control 108 is not known to already exist. Those of ordinary skill in the art will appreciate that passive weaknesses, direct active weaknesses, and indirect active weaknesses are based on the Common Configuration Scoring System as established by the National Institute of Standards and Technology. In various aspects, any other suitable weakness categories and/or sub-categories can be implemented.

The machine learning classifier 302 can receive as input numerical representations, as described herein, of technical documentation that describes/characterizes the stipulated control 108, and can determine as output a weakness category pertaining to the stipulated control 108 (e.g., can determine whether the stipulated control 108 pertains to a passive weakness, a direct active weakness, or an indirect active weakness). In various aspects, the weakness component 116 can generate and/or compute the weakness factor 302 based on the determined weakness category. For example, if the machine learning classifier 302 determines that the stipulated control 108 pertains to a passive weakness, the weakness component 116 can determine that the failure of the state 106 to comply with the stipulated control 108 is not especially serious (e.g., passive weaknesses can be considered as not especially serious since they are not associated with the performance of unauthorized actions; instead, passive weaknesses are associated with the prevention of authorized actions, and it is axiomatic in the field that the performance of unauthorized actions is a worse threat than the prevention of authorized actions). Accordingly, the weakness factor 304 can be set to a commensurately low value (e.g., 0 as shown in FIG. 4). If the machine learning classifier 302 instead determines that the stipulated control 108 pertains to a direct active weakness, the weakness component 116 can determine that the failure of the state 106 to comply with the stipulated control 108 is especially serious (e.g., direct active weaknesses can be considered as especially serious since known exploits already exist). Accordingly, the weakness factor 304 can be set to a commensurately high value (e.g., 3 as shown in FIG. 4). In various cases, if the machine learning classifier 302 determines that the stipulated control 108 pertains to an indirect active weakness, the weakness component 116 can determine that the failure of the state 106 to comply with the stipulated control 108 depends upon the magnitude of non-compliance (e.g., indirect active weakness can be considered as variably serious depending upon the severity of non-compliance since they are associated with the performance of unauthorized actions but no known exploits already exist). Accordingly, the weakness factor 304 can be a function of the difference (e.g., percentage difference and/or absolute difference) between the state 106 and the stipulated control 108. In various cases, when the stipulated control 108 pertains to an indirect active weakness, the value of the weakness factor 304 can be bounded below by the value set for passive weaknesses and can be bounded above by the value set for direct active weaknesses. For example, if the state 106 complies with the stipulated control 108, the weakness factor 304 can be 0; if the state 106 violates the stipulated control 108 by a first predetermined margin/ percentage (e.g., if the state 106 is 50% too high/low), the weakness factor 304 can be a commensurately higher value (e.g., 1), if the state 106 violates the stipulated control 108 by a second predetermined margin/percentage that is larger than the first predetermined margin/percentage (e.g., if the state 106 is 75% too high/low), the weakness factor 304 can be an even higher value (e.g., 2). In any case, when the stipulated control 108 pertains to an indirect active weakness, the weakness factor 304 can be any suitable function of a difference between the state 106 and the stipulated control 108. As mentioned above, conventional health-check risk assessment techniques ignore such differences.

In various aspects, the machine learning classifier 302 can be trained using any suitable training technique (e.g., supervised learning, unsupervised learning, reinforcement learning). Moreover, in some cases, the machine learning classifier 302 can undergo active learning. That is, in various embodiments, the weakness component 116 can receive real-time feedback from any suitable operator (not shown) regarding outputted weakness category classifications that are generated by the machine learning classifier 302. In various aspects, parameters of the machine learning classifier 302 can be updated and/or retrained (e.g., via back-propagation) based on such feedback.

To facilitate some of the above-described machine learning aspects of various embodiments of the invention, consider the following discussion of artificial intelligence. Various embodiments of the present invention herein can employ artificial intelligence (AI) to facilitate automating one or more features of the present invention. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present invention, components of the present invention can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information)) schemes and/or systems (e.g., support vector machines, neural networks, expert systems, Bayesian belief networks, fuzzy logic, data fusion engines) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 5:
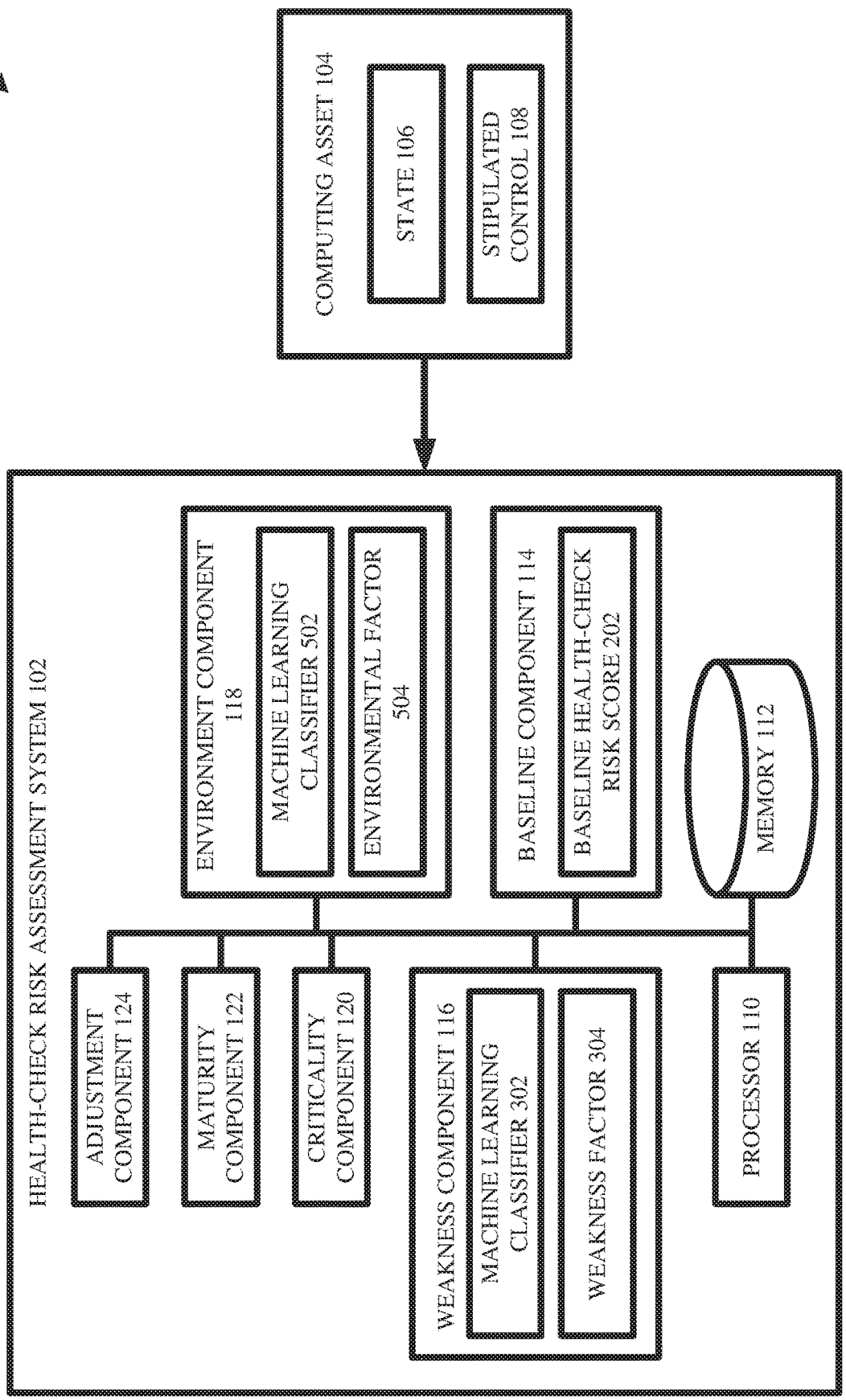
FIG. 5 illustrates a block diagram of an example, non-limiting system including an environmental factor that facilitates automated health-check risk assessment of computing assets in accordance with one or more embodiments described herein.

FIG. 5 illustrates a block diagram of an example, non-limiting system 500 including an environmental factor that can facilitate automated health-check risk assessment of computing assets in accordance with one or more embodiments described herein. As shown, the system 500 can, in some cases, comprise the same components as the system 300, and can further comprise a machine learning classifier 502 and an environmental factor 504.

In various embodiments, the machine learning classifier 502 can be any suitable computer-implemented artificial intelligence algorithm that can be trained to receive input information regarding the computing asset 104 and to generate as output determinations regarding the computing asset 104. Although not shown in the figures, in some aspects, the environmental component 118 can electronically receive and/or retrieve as input one or more asset documents from any suitable electronically accessible data source. In various cases, the one or more asset documents can be technical documentation that describes and/or characterizes properties, purposes, and/or details of the computing asset 104 (e.g., GitHub documents, design/development documents). In various aspects, the one or more asset documents can be written in any suitable natural language (e.g., any suitable human-readable text), and the environmental component 118 can generate a numerical representation, as described herein, of the one or more asset documents by any suitable technique, such as word embedding and/or language modeling. In various cases, the machine learning classifier 502 can be trained to receive as input the numerical representation of the one or more asset documents that describe the computing asset 104 (e.g., the numerical representations can be considered as inputted feature vectors), and to determine as output what built-in security mechanisms the computing asset 104 employs. In various cases, various above-described artificial intelligence details can apply to the machine learning classifier 502. In various aspects, the environment component 118 can then generate the environmental factor 504 based on the security mechanisms detected by the machine learning classifier 502.

FIG. 6 illustrates an example, non-limiting table 600 associated with environmental factors in accordance with one or more embodiments described herein. In other words, table 600 shows various, non-limiting security mechanisms that can be implemented by the computing asset 104 and that can be detected by the machine learning classifier 502. Moreover, the table 600 shows various non-limiting weights that can be assigned to each security mechanism. For instance, the machine learning classifier 502 can determine what type of access is implemented by the computing asset 104 (e.g., internal-only (more protection) vs. publicly accessible (less protection)), what type of modification paradigm is implemented by the computing asset 104 (e.g., immutable (more protection) vs. mutable/ephemeral (less protection)), what type of instantiation paradigm is implemented by the computing asset 104 (e.g., isolated (more protection) vs. multi-tenancy (less protection)), whether servicing is still available to the computing asset 104 (e.g., available (more protection) vs. unavailable (less protection)), what type of data protection protocol is implemented by the computing asset 104 (e.g., automatic discovery (less protection) vs. masking/encryption (more protection)), what type of compliance enforcement is implemented by the computing asset 104 (e.g., inspection only (less protection) vs. remediation (more protection)), and/or what type of anomaly detection is implemented by the computing asset 104 (e.g., notification only (less protection) vs. prevention/interception (more protection)). It is to be appreciated that FIG. 6 is a non-limiting example, and that any other suitable security mechanisms can be detectable by the machine learning classifier 502.

As shown, the environmental component 118 can assign different values/weights to different security mechanisms, and the environmental factor 504 can be any suitable function (e.g., maximum, average) of the values/weights of the different security mechanisms which the computing asset 104 implements. For example, if the computing asset 104 is only internally accessible (0.2), is mutable/ephemeral (0.6), and provides notifications only (0.8), the environmental factor 504 can be the maximum of 0.2, 0.6, and 0.8, namely 0.8. In another embodiment, the environmental factor 504 can be an average of 0.2, 0.6, and 0.8.

Figure 7:
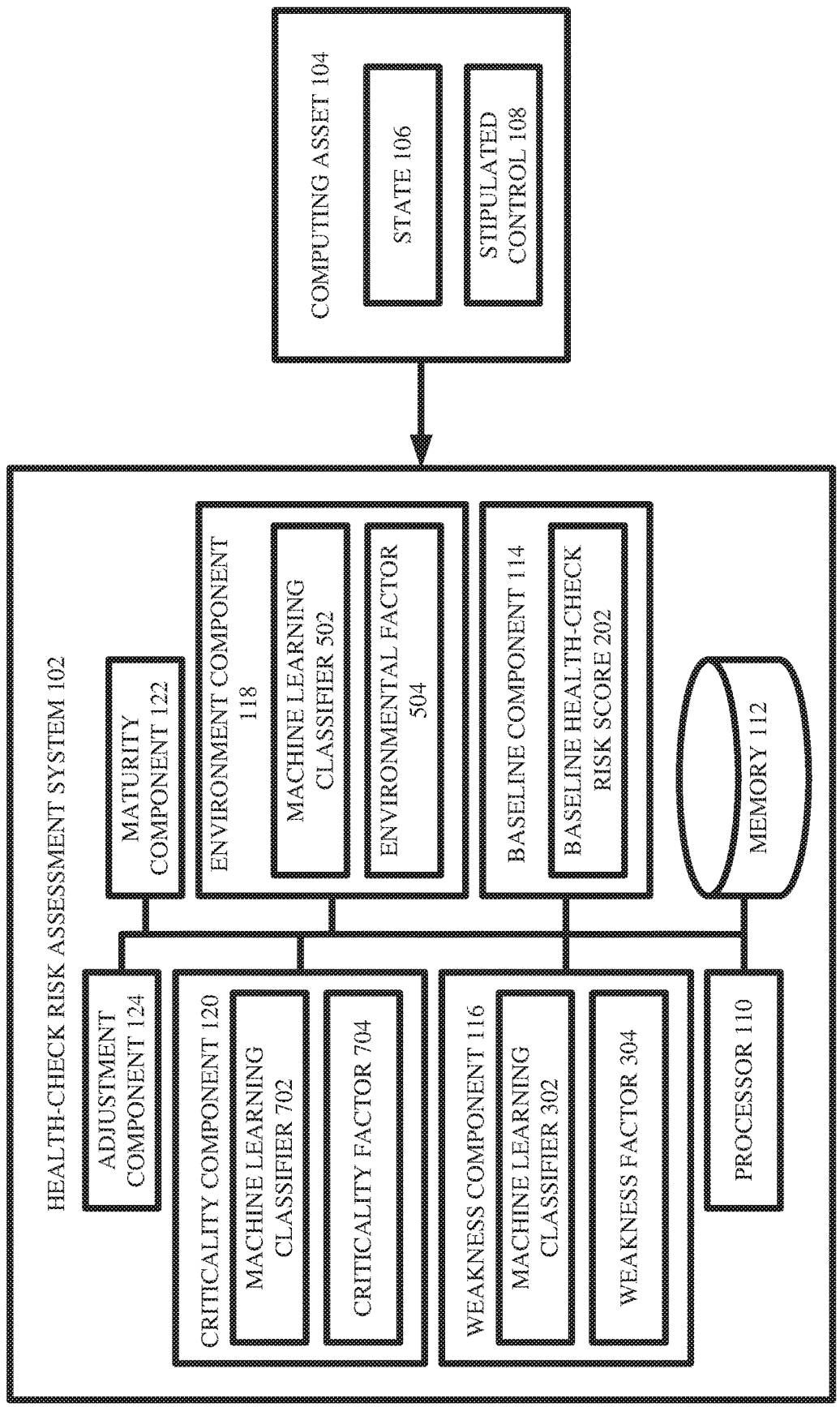
FIG. 7 illustrates a block diagram of an example, non-limiting system including a criticality factor that facilitates automated health-check risk assessment of computing assets in accordance with one or more embodiments described herein.

FIG. 7 illustrates a block diagram of an example, non-limiting system 700 including a criticality factor that can facilitate automated health-check risk assessment of computing assets in accordance with one or more embodiments described herein. As shown, the system 700 can, in some cases, comprise the same components as the system 500, and can further comprise a machine learning classifier 702 and a criticality factor 704.

In various embodiments, the machine learning classifier 702 can be any suitable computer-implemented artificial intelligence algorithm that can be trained to receive input information regarding the computing asset 104 and to generate as output determinations regarding the computing asset 104. Although not shown in the figures, in some aspects, the criticality component 120 can electronically receive and/or retrieve as input one or more documents from any suitable electronically accessible data source. In various cases, the one or more documents can describe and/or characterize properties, purposes, goals, and/or details of the computing asset 104 and/or of the entity that owns/operates the computing asset 104 (e.g., advertisements, mission statements, business plans/presentations). In various aspects, the one or more documents can be written in any suitable natural language (e.g., any suitable human-readable text), and the criticality component 120 can generate a numerical representation, as described herein, of the one or more documents by any suitable technique, such as word embedding and/or language modeling. In various cases, the machine learning classifier 702 can be trained to receive as input the numerical representation of the one or more documents that describe the computing asset 104 and the entity that owns/operates the computing asset 104 (e.g., the numerical representations can be considered as inputted feature vectors), and to determine as output a level of importance of the computing asset 104 to the goals/purposes/activities of the entity that owns/operates the computing asset 104. In various instances, the level of importance of the computing asset 104 can be based on an entire application cluster that is associated with the computing asset 104 (e.g., the importance of a server can be based on not just the server itself, but also based on any applications that run on the server and/or based on any data that is stored, maintained, retrieved, edited, and/or otherwise interacted with by the server). In various cases, various above-described artificial intelligence details can apply to the machine learning classifier 702. In various aspects, the criticality component 120 can then generate the criticality factor 704 based on the level of importance determined by the machine learning classifier 702.

For instance, if the machine learning classifier 702 determines that the computing asset 104 is not very important to the goals/purposes/activities of the entity that owns/operates the computing asset 104, the criticality component 704 can be low in value (e.g., a banking institution can utilize a website for advertisement purposes; because the website is not that important to the goals/purposes/activities of the banking institution, the criticality factor 704 for the website can be 0). If the machine learning classifier 702 determines that the computing asset 104 is important to the goals/purposes/activities of the entity that owns/operates the computing asset 104, the criticality component 704 can be moderate in value (e.g., a banking institution can utilize a database for storing sensitive client information; because the database is important to the goals/purposes/activities of the banking institution, the criticality factor 704 for the database can be 1.3). If the machine learning classifier 702 determines that the computing asset 104 is very important to the goals/purposes/activities of the entity that owns/operates the computing asset 104, the criticality component 704 can be high in value (e.g., a banking institution can utilize a software application for electronically transferring funds into and/or out of client accounts; because the software application is very important to the goals/purposes/activities of the banking institution, the criticality factor 704 for the software application can be 4.3). In various aspects, any suitable number of criticality levels/gradations can be implemented (e.g., non-critical, critical, hyper-critical, and/or any other intermediate levels). In some embodiments, the entity that owns/operates the computing asset 104 can manually configure the criticality factor 704 as desired. As mentioned above, conventional health-check risk assessment techniques ignore importance levels of computing assets.

Figure 8:
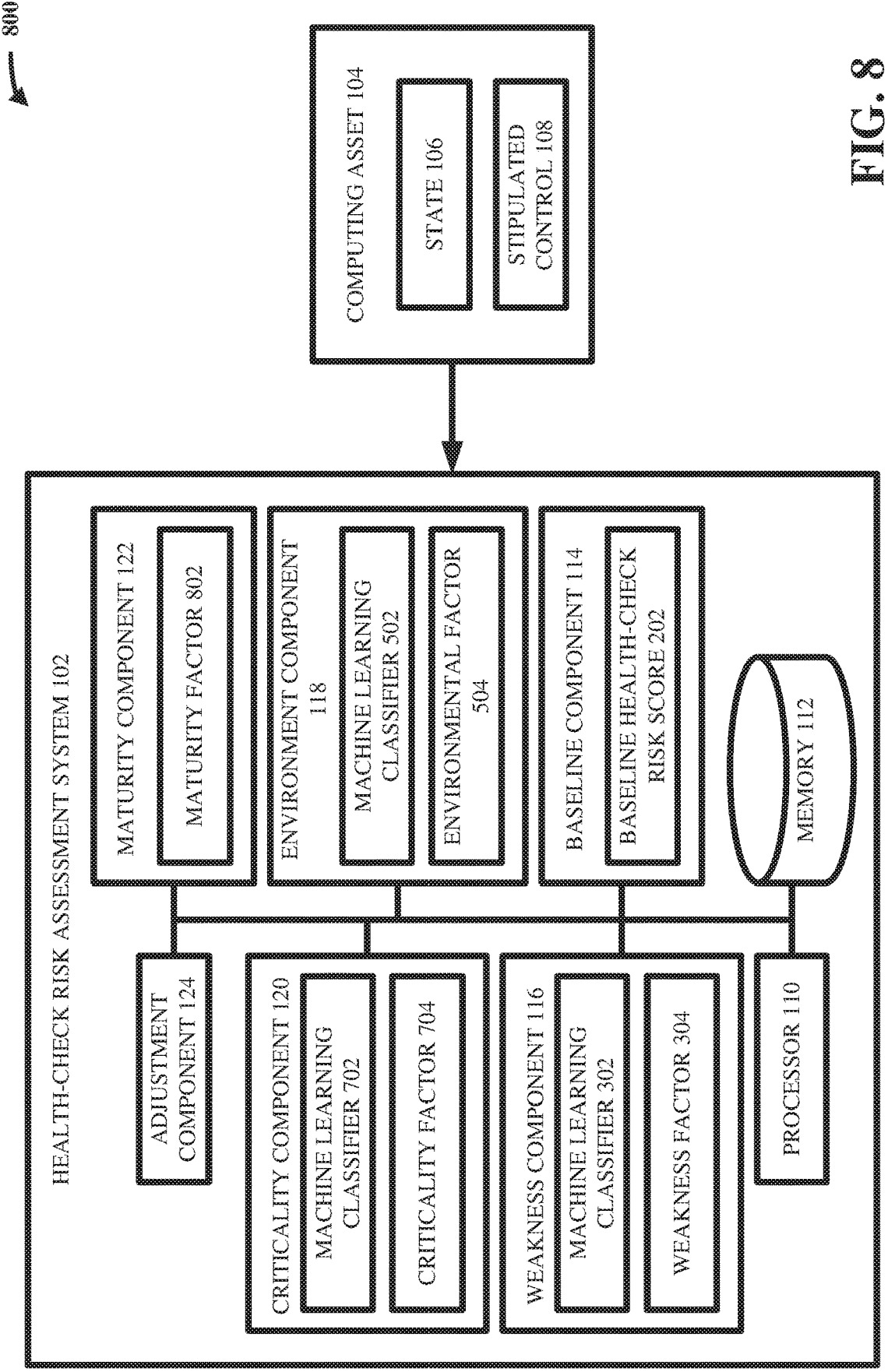
FIG. 8 illustrates a block diagram of an example, non-limiting system including a maturity factor that facilitates automated health-check risk assessment of computing assets in accordance with one or more embodiments described herein.

FIG. 8 illustrates a block diagram of an example, non-limiting system 800 including a maturity factor that can facilitate automated health-check risk assessment of computing assets in accordance with one or more embodiments described herein. As shown, the system 800 can, in some cases, comprise the same components as the system 700, and can further comprise a maturity factor 802.

Although not shown in the figures, in various embodiments, the maturity component 122 can electronically receive and/or retrieve from any suitable electronically accessible data source a recommended control that corresponds to the stipulated control 108. In various aspects, as mentioned above, the stipulated control 108 can be considered as the rule, regulation, standard, and/or benchmark established by the entity that owns/operates the computing asset 104 which should be complied with by the state 106. In various instances, however, the recommended control can be a best practice that is implemented in the relevant industry, and it is possible that the stipulated control 108 does not match and/or is not consistent with the recommended control. Thus, in some cases, the state 106 can comply with the stipulated control 108 and yet still present a serious security threat since the stipulated control 108 can be more lax and/or less stringent than the recommended control. For example, suppose that the stipulated control 108 specifies a maximum acceptable password age of 60 days and that the recommended control specifies a maximum acceptable password age of 30 days. If the state 106 is an actual password age of 50 days, the state 106 can be considered as compliant with the stipulated control 108, yet the state 106 can nevertheless be a significant security threat since it does not comply with the recommended control (e.g., since the stipulated state 108 is much less rigorous and/or much less secure than the recommended control). In various aspects, the value of the maturity factor 802 can thus be any suitable function of a difference and/or deviation between the stipulated control 108 and the recommended control (e.g., can be proportional to the percentage difference and/or absolute difference). As mentioned above, conventional health-check risk assessment techniques ignore such differences/deviations.

In some cases, as explained further below, the computing asset 104 can be governed by and/or subject to many different stipulated controls. In such case, the maturity factor 802 can be based on an average difference and/or average deviation between such different stipulated controls and their corresponding best practice values. If the average difference/deviation is greater than a first predetermined threshold, the maturity factor 802 can take on a first value. If the average difference/deviation is greater than a second predetermined threshold, the maturity factor 802 can take on a second value. Any suitable number of predetermined thresholds and/or values can be implemented.

Figure 9:
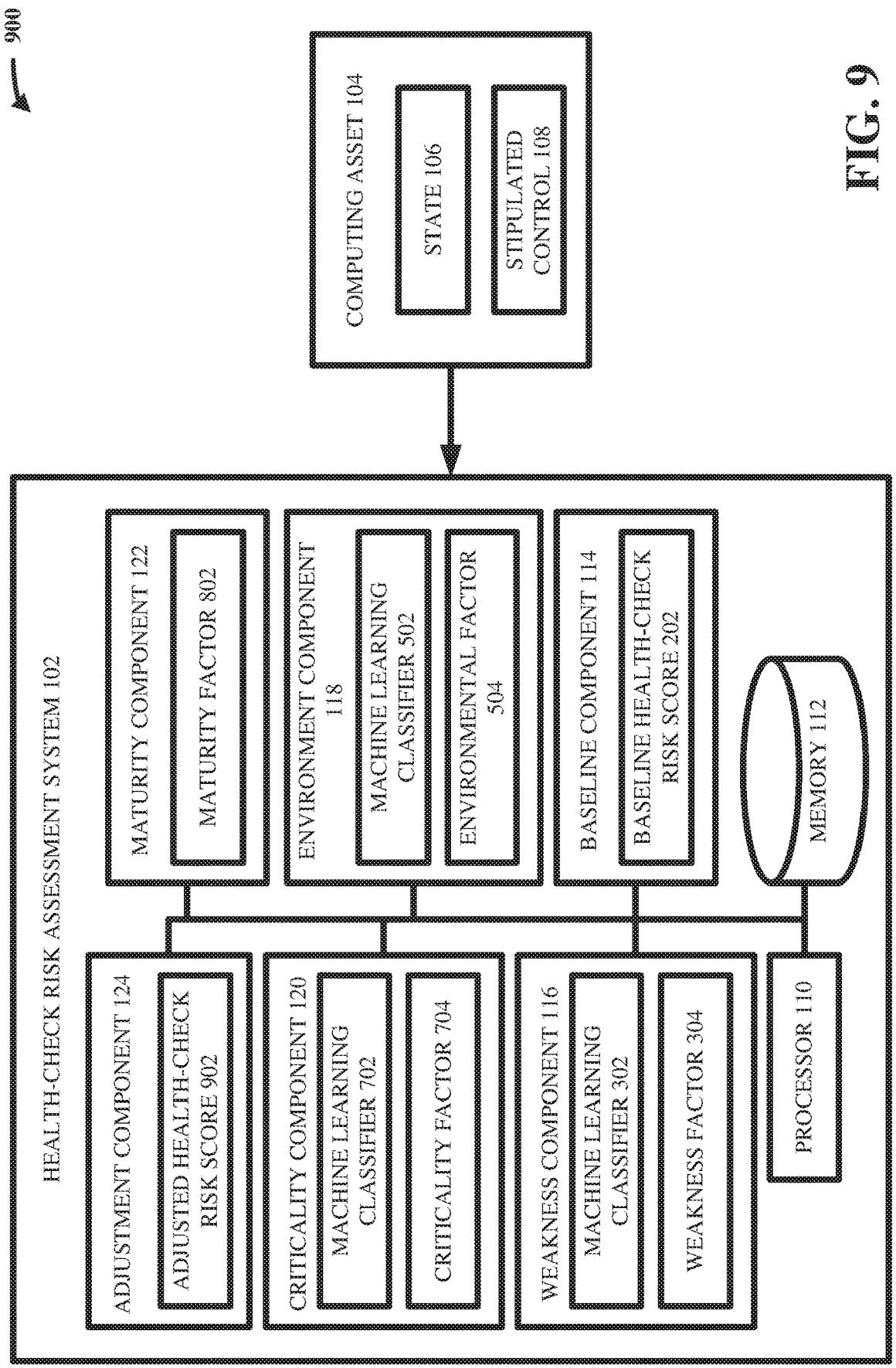
FIG. 9 illustrates a block diagram of an example, non-limiting system including an adjustment component that facilitates automated health-check risk assessment of computing assets in accordance with one or more embodiments described herein.

FIG. 9 illustrates a block diagram of an example, non-limiting system 900 including an adjustment component that can facilitate automated health-check risk assessment of computing assets in accordance with one or more embodiments described herein. As shown, the system 900 can, in some cases, comprise the same components as the system 800, and can further comprise an adjustment component 124.

In various embodiments, the adjustment component 124 can adjust the baseline health-check risk score 202 based on the weakness factor 304, the environmental factor 504, the criticality factor 704, and/or the maturity factor 802. Specifically, the adjustment component 124 can multiply the baseline health-check risk score 202 by the environmental factor 504, thereby yielding a first product. In various aspects, the adjustment component 124 can add the weakness factor 304 to the first product, thereby yielding a first sum. In various instances, the adjustment component 124 can multiply the first sum by the criticality component 704, thereby yielding a second product. In various cases, the adjustment component 124 can multiply the second product by the maturity component 802, thereby yielding an adjusted health-check risk score 902. In other words, the adjusted health-check risk score 902 can be given by:

$$ARS=(BRS*EF+WF)*CF*MF$$

where ARS represents the adjusted health-check risk score 902, where BRS represents the baseline health-check risk score 202, where EF represents the environmental factor 504, where WF represents the weakness factor 304, where CF represents the criticality factor 704, and where MF represents the maturity factor 802. In various aspects, the above equation showing how ARS can be a function of BRS, EF, WF, CF, and MF is a non-limiting example of an equation that can be used to generate the adjusted health-check risk score 902, but other equations are possible. For instance, the adjusted health-check risk score 902 can be any other suitable mathematical function of the weakness factor 304, the environmental factor 504, the criticality factor 704, and/or the maturity factor 802 (e.g., EF can be added rather than multiplied, WF can be multiplied rather than added, CF can be added rather than multiplied, MF can be added rather than multiplied). That is, in various embodiments, any other suitable equations and/or mathematical operations can be applied in any suitable permutations and/or combinations to BRS, EF, WF, CF, and MF in order to generate ARS. In various cases, the adjusted health-check risk score 902 can more accurately quantify a level of risk associated with non-compliance of the state 106 with the stipulated control 108, because the adjusted health-check risk score 902 takes into account the severity/magnitude of non-compliance (e.g., weakness factor 304), built-in security mechanisms of the computing asset 104 (e.g., environmental factor 504), the importance of the computing asset 104 (e.g., criticality factor 704), and/or differences between the stipulated control 108 and best practices (e.g., maturity factor 802).

In various embodiments, the health-check risk assessment system 102 can perform any suitable action based on the adjusted health-check risk score 902. For instance, the health-check risk assessment system 102 can generate, transmit, and/or display on a computer monitor/screen electronic warnings/alerts based on the adjusted health-check risk score 902 (e.g., if the adjusted health-check risk score 902 is above a predetermined threshold, a suitable warning/alert can be generated and/or displayed). In some cases, the health-check risk assessment system 102 can automatically schedule, request, and/or procure servicing/maintenance for the computing asset 104 based on the adjusted health-check risk score 902 (e.g., the health-check risk assessment system 102 can automatically electronically contact a servicing/maintenance entity if the adjusted health-check risk score 902 exceeds a predetermined threshold).

Figure 10:
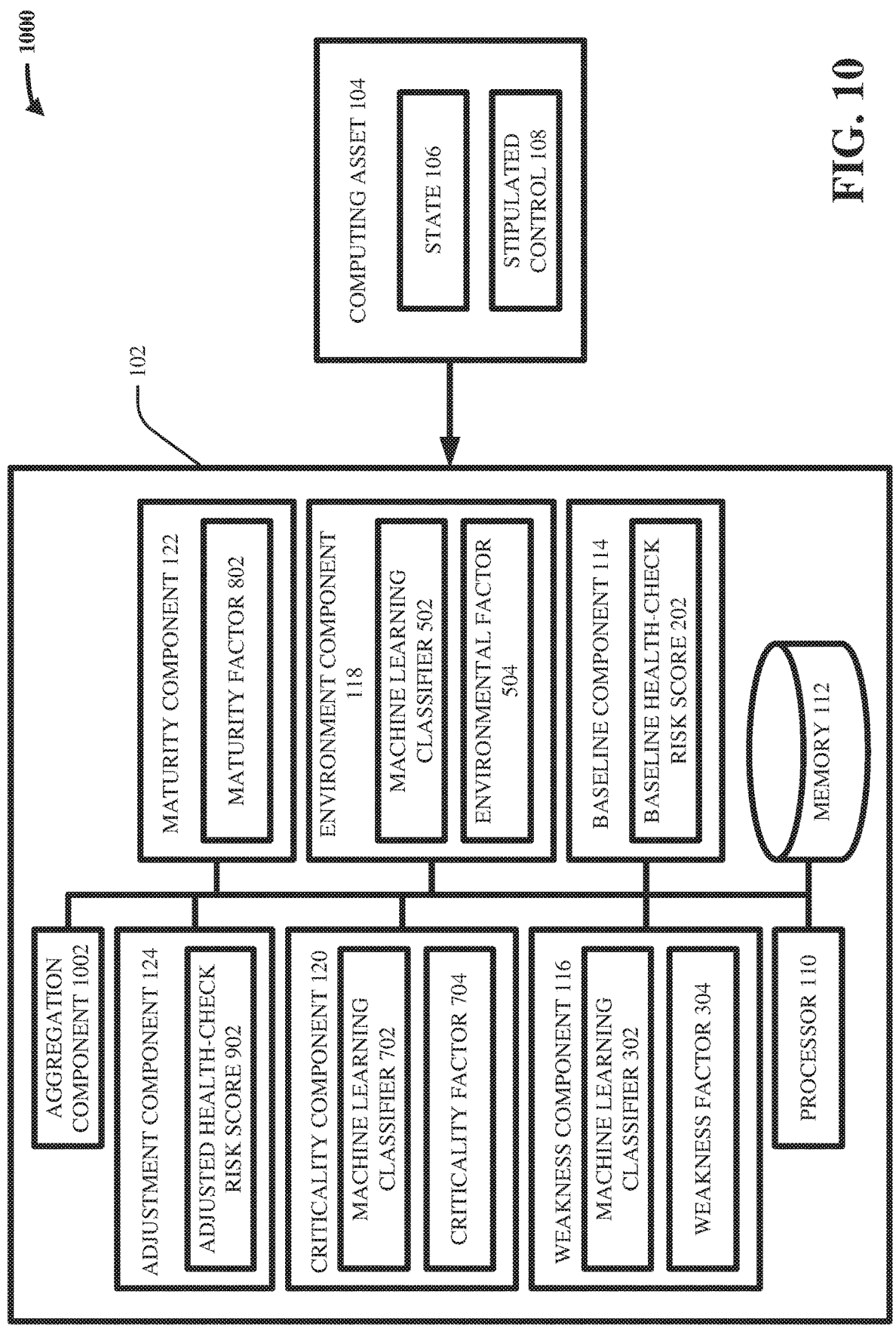
FIG. 10 illustrates a block diagram of an example, non-limiting system including an aggregation component that facilitates automated health-check risk assessment of computing assets in accordance with one or more embodiments described herein.

FIG. 10 illustrates a block diagram of an example, non-limiting system 1000 including an aggregation component that can facilitate automated health-check risk assessment of computing assets in accordance with one or more embodiments described herein. As shown, the system 1000 can, in some cases, comprise the same components as the system 900, and can further comprise an aggregation component 1002.

The above description so far mainly explains how the health-check risk assessment system 102 can generate the adjusted health-check risk score 902 for the computing asset 104 based on the stipulated control 108. However, in various embodiments, the computing asset 104 can be governed by a plurality of stipulated controls (shown in FIG. 11). In such cases, the health-check risk assessment system 102 can generate/compute a separate adjusted health-check risk score for each of the plurality of stipulated controls that govern the computing asset 104, and the aggregation component 1002 can aggregate such adjusted health-check risk scores together via any suitable technique (e.g., via weighted-average functions, via max-functions), thereby yielding an aggregated health-check risk score for the computing asset 104. Moreover, in some cases, the health-check risk assessment system 102 can be electronically coupled to a plurality of computing assets (shown in FIG. 11). In various aspects, the health-check risk assessment system 102 can compute a separate aggregated health-check risk score for each of the plurality of computing assets, and the aggregation component 1002 can aggregate such aggregated health-check risk scores together via any suitable techniques (e.g., via weighted-average functions and/or max-functions).

Figure 11:
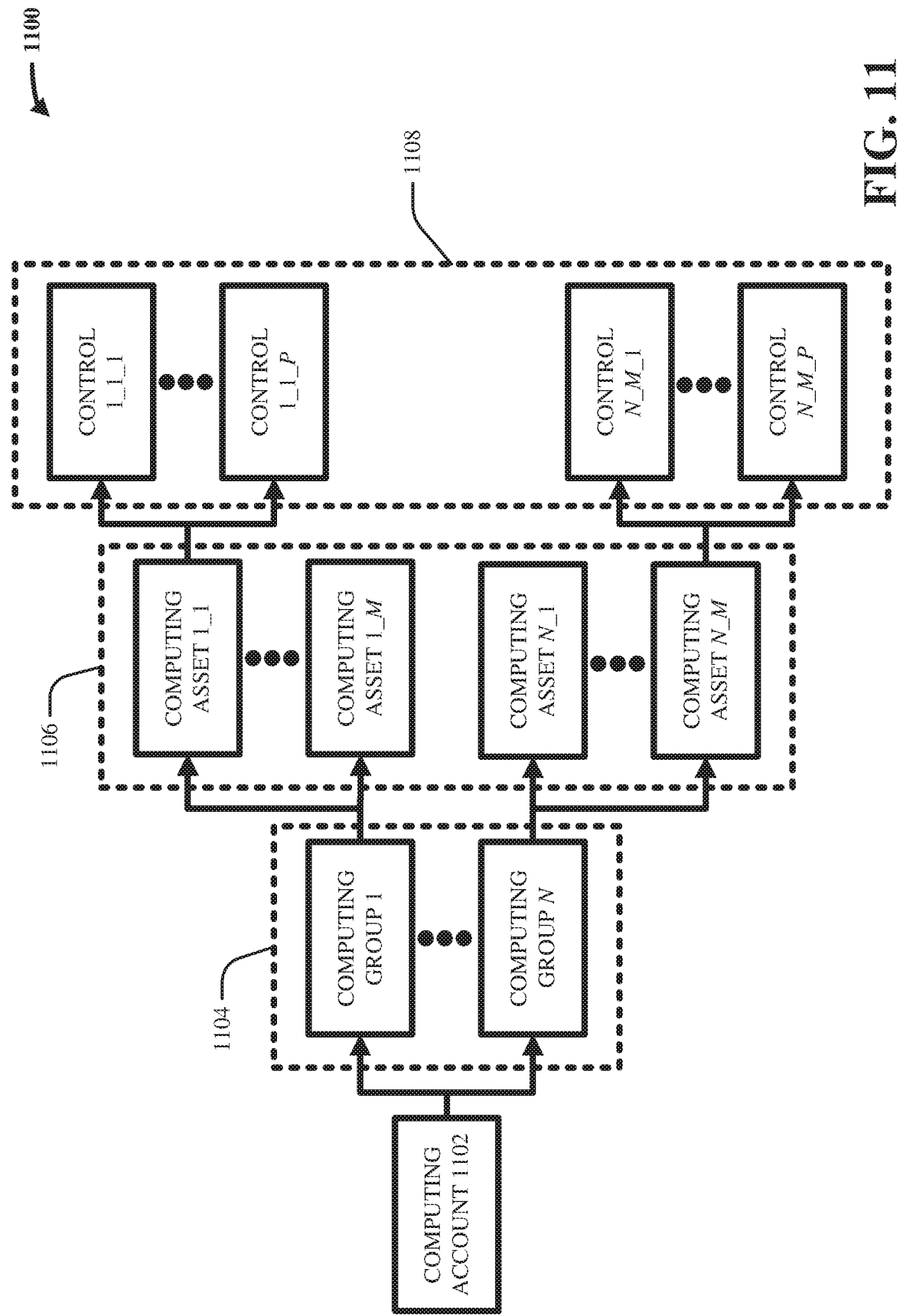
FIG. 11 illustrates a block diagram of an example, non-limiting computing asset hierarchy in accordance with one or more embodiments described herein.

FIG. 11 illustrates a block diagram of an example, non-limiting computing asset hierarchy 1100 in accordance with one or more embodiments described herein. As shown, a computing account 1102 can comprise a plurality of computing groups 1104. Moreover, in some cases, the plurality of computing groups 1104 can comprise a plurality of computing assets 1106, which can be governed by and/or subject to a plurality of stipulated controls 1108. Specifically, the plurality of computing groups 1104 can comprise the computing group 1 to the computing group N, for any suitable number N. Furthermore, as shown, the computing group 1 can itself correspond to a plurality of computing assets (e.g., computing asset 1_1 to computing asset 1_M, for any suitable number M). Similarly, the computing group N can correspond to a plurality of computing assets (e.g., computing asset N_1 to computing asset N_M, for any suitable number M). Although the computing group 1 and the computing group N are depicted as having the same number of computing assets, this is a non-limiting example. In various cases, they can have different numbers of computing assets. In various aspects, the computing asset 1_1 can be governed by and/or subject to a plurality of stipulated controls (e.g., control 1_1_1 to control 1_1_P, for any suitable number P). Similarly, the computing asset N_M can be governed by and/or subject to a plurality of stipulated controls (e.g., control N_M_1 to control N_M_P, for any suitable number P). Although the computing asset 1_1 and the computing asset N_M are depicted as being subject to the same number of stipulated controls, this is a non-limiting example. In various cases, they can be subject to different numbers of stipulated controls.

As explained above, the health-check risk assessment system 102 can generate an adjusted health-check risk score for each of the plurality of stipulated controls 1108 (e.g., can compute a baseline health-check risk score for each stipulated control, a weakness factor for each stipulated control, an environmental factor for each stipulated control, a criticality factor for each stipulated control, and/or a maturity factor for each stipulated control, and can combine these together via the adjustment component 124 to compute an adjusted health-check risk score for each stipulated control, thereby yielding a total of N*M*P adjusted health-check risk scores). In various instances, for each of the plurality of computing assets 1106, the aggregation component 1002 can aggregate together all of the adjusted health-check risk scores pertaining to that computing asset (e.g., via weighted-averages and/or max-functions) to form an aggregated asset health-check risk score for the computing asset (e.g., can aggregate the adjusted health-check risk scores pertaining to the computing asset 1_1 to generate an aggregated asset health-check risk score for the computing asset 1_1, can aggregate the adjusted health-check risk scores pertaining to the computing asset 1_M to generate an aggregated asset health-check risk score for the computing asset 1_M, can aggregate the adjusted health-check risk scores pertaining to the computing asset N_1 to generate an aggregated asset health-check risk score for the computing asset N_1, and can aggregate the adjusted health-check risk scores pertaining to the computing asset N_M to generate an aggregated asset health-check risk score for the computing asset N_M, thereby yielding a total of N*M aggregated asset health-check risk scores). In various embodiments, for each of the plurality of computing groups 1104, the aggregation component 1002 can aggregate together all of the aggregated asset health-check risk scores pertaining to that computing group (e.g., via weighted-averages and/or max-functions) to form an aggregated group health-check risk score for the computing group (e.g., can aggregate the aggregated asset health-check risk scores pertaining to the computing group 1 to generate an aggregated group health-check risk score for the computing group 1, and can aggregate the aggregated asset health-check risk scores pertaining to the computing group N to generate an aggregated group health-check risk score for the computing group N, thereby yielding a total of N aggregated group health-check risk scores). Finally, in various aspects, the aggregation component 1002 can aggregate together all of the aggregated group health-check risk scores (e.g., via weighted-averages and/or max-functions) to generate an aggregated account health-check risk score. In this way, an accurate health-check risk score can be generated at any suitable level of granularity (e.g., for each stipulated control, for each computing asset, for each computing group, and/or for each computing account). Thus, the health-check risk assessment system 102 can make it easier for an operator to accurately triage various non-compliant controls, various computing assets, various computing groups, and/or various computing accounts, which constitutes a useful and practical application of computers. In other words, management, servicing, and/or maintenance of the computing assets can be prioritized according to the adjusted and/or aggregated health-check risk scores (e.g., computing assets/groups/accounts with higher health-check risk scores can be considered as more pressing and thus can be serviced first, and computing assets/groups/accounts with lower health-check risk scores can be considered as less pressing and thus can be serviced later).

Although the above discussion mentions that weighted-averages and/or max-functions can be used to aggregate health-check risk scores to higher levels (e.g., aggregate computing assets to computing groups, aggregate computing groups to computing account), this is a non-limiting example. In various aspects, any other suitable aggregation algorithms can be implemented. For instance, the total risk of a computing group can be determined by counting a number of high-risk computing assets (e.g., a computing asset can be high-risk if its aggregated asset health-check risk score exceeds a high threshold), counting a number of medium-risk computing assets (e.g., a computing asset can be medium-risk if its aggregated asset health-check risk score exceeds a medium threshold), and/or counting a number of low-risk computing assets (e.g., a computing asset can be low-risk if its aggregated asset health-check risk score exceeds a low threshold) in the computing group. For example, if the computing group has more than 1% high-risk computing assets or more than 20% medium-risk computing assets, the computing group can be considered as high risk; if the computing group has fewer than 1% high-risk computing assets, fewer than 20% medium-risk computing assets, or more than 50% low-risk computing assets, the computing group can be considered as medium-risk; otherwise, the computing group can be considered as low risk.

Figure 12:
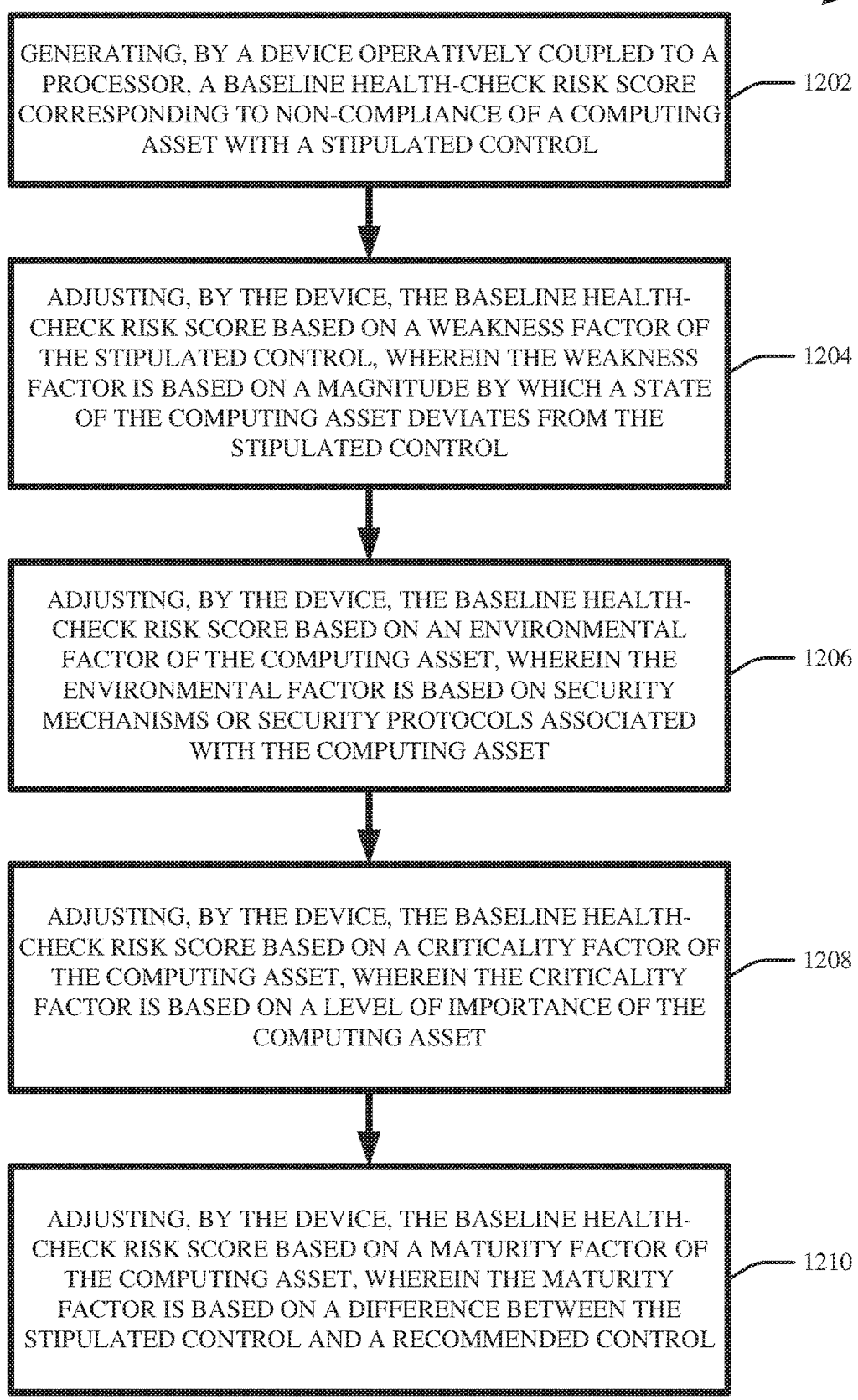
FIG. 12 illustrates a flow diagram of an example, non-limiting computer-implemented method that facilitates automated health-check risk assessment of computing assets in accordance with one or more embodiments described herein.

FIG. 12 illustrates a flow diagram of an example, non-limiting computer-implemented method 1200 that can facilitate automated health-check risk assessment of computing assets in accordance with one or more embodiments described herein. Note that the actions performed in FIG. 12 are non-limiting examples and may be performed in any suitable order (e.g., not restricted to the order shown in FIG. 12).

In various embodiments, act 1202 can include generating, by a device operatively coupled to a processor (e.g., 114), a baseline health-check risk score (e.g., 202) corresponding to non-compliance of a computing asset (e.g., 104) with a stipulated control (e.g., 108).

In various instances, act 1204 can include adjusting, by the device (e.g., 116), the baseline health-check risk score based on a weakness factor (e.g., 304) of the stipulated control, wherein the weakness factor can be based on a magnitude by which a state (e.g., 106) of the computing asset deviates from the stipulated control.

In various aspects, act 1206 can include adjusting, by the device (e.g., 118), the baseline health-check risk score based on an environmental factor (e.g., 504) of the computing asset, wherein the environmental factor can be based on security mechanisms or security protocols associated with the computing asset.

In various cases, act 1208 can include adjusting, by the device (e.g., 120), the baseline health-check risk score based on a criticality factor (e.g., 704) of the computing asset, wherein the criticality factor can be based on a level of importance of the computing asset.

In various instances, act 1210 can include adjusting, by the device (e.g., 122), the baseline health-check risk score based on a maturity factor (e.g., 802) of the computing asset, wherein the maturity factor can be based on a difference between the stipulated control and a recommended control.

It is to be appreciated that numeric values, percentages, and/or thresholds disclosed herein are non-limiting examples. In various aspects, any other suitable values, percentages, and/or thresholds can be implemented.

Although the herein description explains that artificial intelligence paradigms can be utilized to generate/compute the weakness factor 304, the environmental factor 504, the criticality factor 704, and/or the maturity factor 802, this is a non-limiting example. In various aspects, such factors can be generated/computed via any suitable techniques, whether or not machine learning is implemented.

Much of the above discussion uses password-age and/or password-length as examples to clarify the above teachings. Such examples are understood to be non-limiting. In various cases, the herein teachings can apply to any suitable states, characteristics, and/or technical properties of a computing asset.

Various embodiments of the invention constitute a computerized diagnostic tool that can monitor compliance and/or non-compliance of one or more computing assets with one or more stipulated controls, and that can accordingly generate/compute adjusted health-check risk scores that quantify security risks associated with such compliance and/or non-compliance. This can allow operating entities to prioritize what non-compliant issues/assets to service first (e.g., triage). Moreover, as explained above, adjusted health-check risk scores as described herein can be more accurate than baseline health-check risk scores that are conventionally known, since various embodiments of the invention can take into account magnitude of non-compliance, asset criticality, and/or control maturity.

Figure 13:
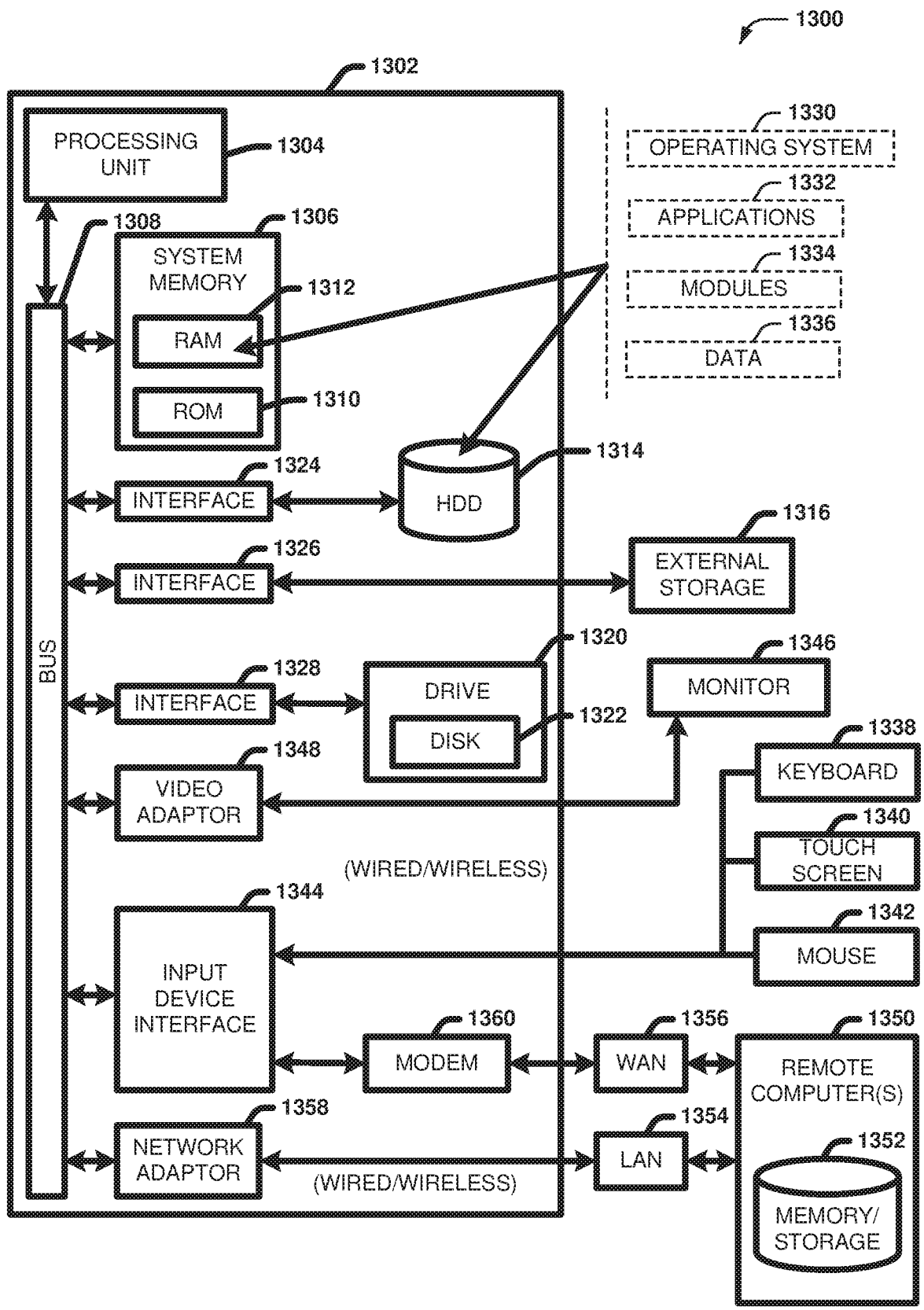
FIG. 13 illustrates a block diagram of an example, non-limiting operating environment in which one or more embodiments described herein can be facilitated.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid state drive, an optical disk drive, which can read or write from a disk 1322, such as a CD-ROM disc, a DVD, a BD, etc. Alternatively, where a solid state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or an ad hoc communication between at least two devices.

Figure 14:
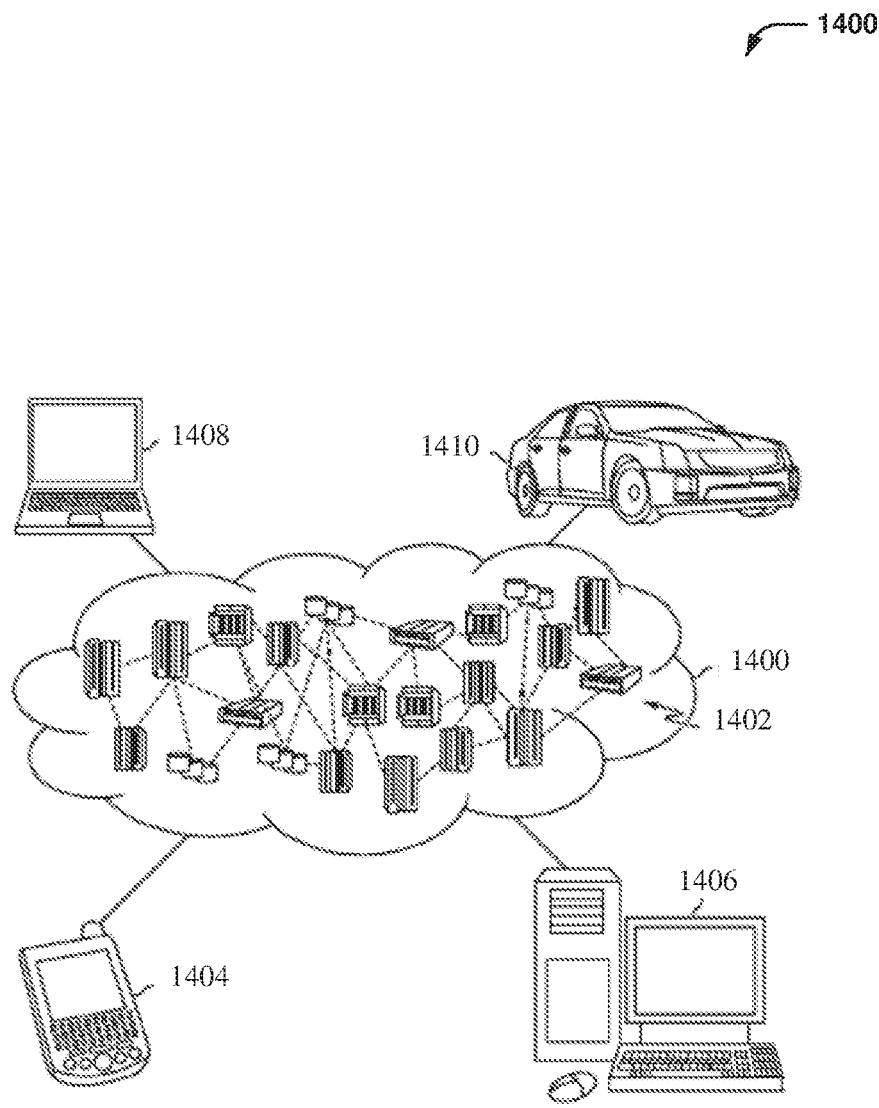
FIG. 14 illustrates an example, non-limiting cloud computing environment in accordance with one or more embodiments described herein.

Referring now to FIG. 14, illustrative cloud computing environment 1400 is depicted. As shown, cloud computing environment 1400 includes one or more cloud computing nodes 1402 with which local computing devices used by cloud consumers, such as, for example, personal digital assistant (PDA) or cellular telephone 1404, desktop computer 1406, laptop computer 1408, and/or automobile computer system 1410 may communicate. Nodes 1402 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms and/or software as services for which a cloud consumer does not need to maintain resources on a local computing device. It is understood that the types of computing devices 1404-1410 shown in FIG. 14 are intended to be illustrative only and that computing nodes 1402 and cloud computing environment 1400 can communicate with any type of computerized device over any type of network and/or network addressable connection (e.g., using a web browser).

Figure 15:
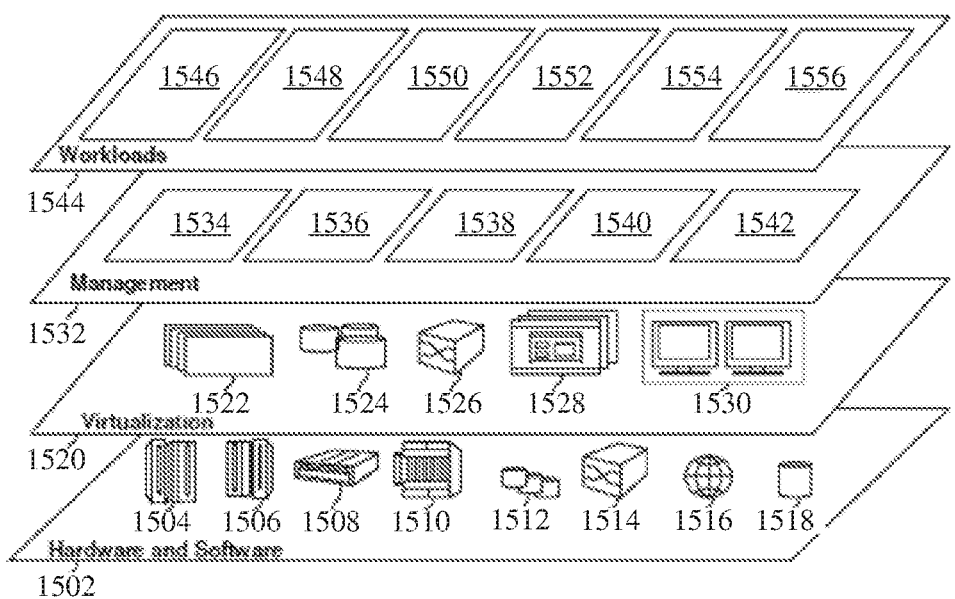
FIG. 15 illustrates example, non-limiting abstraction model layers in accordance with one or more embodiments described herein.

Referring now to FIG. 15, a set of functional abstraction layers provided by cloud computing environment 1400 (FIG. 14) is shown. Repetitive description of like elements employed in other embodiments described herein is omitted for sake of brevity. It should be understood in advance that the components, layers, and functions shown in FIG. 15 are intended to be illustrative only and embodiments of the invention are not limited thereto. As depicted, the following layers and corresponding functions are provided.

Hardware and software layer 1502 includes hardware and software components. Examples of hardware components include: mainframes 1504; RISC (Reduced Instruction Set Computer) architecture based servers 1506; servers 1508; blade servers 1510; storage devices 1512; and networks and networking components 1514. In some embodiments, software components include network application server software 1516 and database software 1518.

Virtualization layer 1520 provides an abstraction layer from which the following examples of virtual entities may be provided: virtual servers 1522; virtual storage 1524; virtual networks 1526, including virtual private networks; virtual applications and operating systems 1528; and virtual clients 1530.

In one example, management layer 1532 may provide the functions described below. Resource provisioning 1534 provides dynamic procurement of computing resources and other resources that are utilized to perform tasks within the cloud computing environment. Metering and Pricing 1536 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1538 provides access to the cloud computing environment for consumers and system administrators. Service level management 1540 provides cloud computing resource allocation and management such that required service levels are met. Service Level Agreement (SLA) planning and fulfillment 1542 provide pre-arrangement for, and procurement of, cloud computing resources for which a future requirement is anticipated in accordance with an SLA.

Workloads layer 1544 provides examples of functionality for which the cloud computing environment may be utilized. Examples of workloads and functions which may be provided from this layer include: mapping and navigation 1546; software development and lifecycle management 1548; virtual classroom education delivery 1550; data analytics processing 1552; transaction processing 1554; and differentially private federated learning processing 1556. Various embodiments of the present invention can utilize the cloud computing environment described with reference to FIGS. 14 and 15 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable components stored in a memory, the computer-executable components comprising:
a baseline component that generates a baseline health-check risk score corresponding to non-compliance of a computing asset with a stipulated control; and
an adjustment component that:
trains a machine learning model to distinguish respective weakness categories of stipulated controls amongst passive weakness, direct active weakness, and indirect active weakness;
determines, via the machine learning model using natural language processing of technical documentation describing one or more effects resulting from non-compliance of the stipulated control, a weakness category of the stipulated control, wherein the determining comprises:
determining whether the weakness category is the passive weakness,
determining whether the weakness category is the direct active weakness, and
determining whether the weakness category is the indirect active weakness, wherein:
the passive weakness indicates that non-compliance with the stipulated control can enable an attacker to prevent the computing asset from performing an authorized action,
the indirect active weakness indicates that non-compliance with the stipulated control can enable the attacker to perform an unauthorized action with the computing asset, and there is no known exploit of the stipulated control that exists, and
the direct active weakness indicates that non-compliance with the stipulated control can enable the attacker to perform the unauthorized action with the computing asset, and there is a known exploit of the stipulated control that exists;
adjusts the baseline health-check risk score based on a weakness factor of the stipulated control, wherein the weakness factor is based on the weakness category of the stipulated control and a magnitude by which a state of the computing asset deviates from the stipulated control; and
in response to the adjusted baseline health-check risk score satisfying a criterion associated with a predetermined threshold, shut down the computing asset.

2. The system of claim 1, wherein the adjustment component further adjusts the baseline health-check risk score based on an environmental factor of the computing asset, wherein the environmental factor is based on security mechanisms or security protocols associated with the computing asset.

3. The system of claim 2, wherein the adjustment component further adjusts the baseline health-check risk score based on a criticality factor of the computing asset, wherein the criticality factor is based on a level of importance associated with the computing asset.

4. The system of claim 3, wherein the adjustment component further adjusts the baseline health-check risk score based on a maturity factor of the computing asset, wherein the maturity factor is based on a difference between the stipulated control and a recommended control.

5. The system of claim 4, the adjustment component further generates at least one of the weakness factor, the environmental factor, the criticality factor, or the maturity factor using the machine learning model.

6. The system of claim 4, wherein the adjustment component multiplies the baseline health-check risk score to the environmental factor thereby yielding a first quantity, adds the weakness factor to the first quantity thereby yielding a second quantity, multiplies the criticality factor by the second quantity, thereby yielding a third quantity, and multiplies the maturity factor by the third quantity, thereby yielding an adjusted health-check risk score corresponding to non-compliance of the computing asset with the stipulated control.

7. The system of claim 1, further comprising:
an aggregation component that aggregates the adjusted health-check risk score with a plurality of other adjusted health-check risk scores corresponding to a plurality of other stipulated controls by applying weighted averages or max-functions to the adjusted health-check risk score and the plurality of other adjusted health-check risk scores.

8. A computer-implemented method, comprising:
training, by a device operatively coupled to a processor, a machine learning model to distinguish respective weakness categories of stipulated controls amongst passive weakness, direct active weakness, and indirect active weakness;
generating, by the device, a baseline health-check risk score corresponding to non-compliance of a computing asset with a stipulated control;
determining, by the device, via the machine learning model using natural language processing of technical documentation describing one or more effects resulting from non-compliance of the stipulated control, a weakness category of the stipulated control, wherein the determining comprises:
determining whether the weakness category is the passive weakness,
determining whether the weakness category is the direct active weakness, and
determining whether the weakness category is the indirect active weakness, wherein:
the passive weakness indicates that non-compliance with the stipulated control can enable an attacker to prevent the computing asset from performing an authorized action,
the indirect active weakness indicates that non-compliance with the stipulated control can enable the attacker to perform an unauthorized action with the computing asset, and there is no known exploit of the stipulated control that exists, and
the direct active weakness indicates that non-compliance with the stipulated control can enable the attacker to perform the unauthorized action with the computing asset, and there is a known exploit of the stipulated control that exists;
adjusting, by the device, the baseline health-check risk score based on the weakness category of the stipulated control and a weakness factor of the stipulated control, wherein the weakness factor is based on a magnitude by which a state of the computing asset deviates from the stipulated control; and in response to the adjusted baseline health-check risk score satisfying a criterion associated with a predetermined threshold, locking, by the device, the computing asset.

9. The computer-implemented method of claim 8, further comprising:

adjusting, by the device, the baseline health-check risk score based on an environmental factor of the computing asset, wherein the environmental factor is based on security mechanisms or security protocols associated with the computing asset.

10. The computer-implemented method of claim 9, further comprising:

adjusting, by the device, the baseline health-check risk score based on a criticality factor of the computing asset, wherein the criticality factor is based on a level of importance associated with the computing asset.

11. The computer-implemented method of claim 10, further comprising:

adjusting, by the device, the baseline health-check risk score based on a maturity factor of the computing asset, wherein the maturity factor is based on a difference between the stipulated control and a recommended control.

12. The computer-implemented method of claim 11, further comprising:

generating, by the device, at least one of the weakness factor, the environmental factor, the criticality factor, or the maturity factor using the machine learning model.

13. The computer-implemented method of claim 11, further comprising:

multiplying, by the device, the baseline health-check risk score to the environmental factor, thereby yielding a first quantity;

adding, by the device, the weakness factor to the first quantity, thereby yielding a second quantity;

multiplying, by the device, the criticality factor by the second quantity, thereby yielding a third quantity; and multiplying, by the device, the maturity factor by the third quantity, thereby yielding an adjusted health-check risk score corresponding to non-compliance of the computing asset with the stipulated control.

14. The computer-implemented method of claim 8, further comprising:

aggregating, by the device, the adjusted health-check risk score with a plurality of other adjusted health-check risk scores corresponding to a plurality of other stipulated controls by applying weighted averages or max-functions to the adjusted health-check risk score and the plurality of other adjusted health-check risk scores.

15. A computer program product for facilitating automated health-check risk assessment of computing assets, the computer program product comprising a computer readable memory having program instructions embodied therewith, the program instructions executable by a processor to cause the processor to:

train, by the processor, a machine learning model to distinguish respective weakness categories of stipulated controls amongst passive weakness, direct active weakness, and indirect active weakness;

generate, by the processor, a baseline health-check risk score corresponding to non-compliance of a computing asset with a stipulated control;

determine, by the processor, via the machine learning model using natural language processing of technical documentation describing one or more effects resulting from non-compliance of the stipulated control, a weakness category of the stipulated control, wherein the determining comprises:

determining whether the weakness category is the passive weakness, determining whether the weakness category is the direct active weakness, and determining whether the weakness category is the indirect active weakness, wherein:

the passive weakness indicates that non-compliance with the stipulated control can enable an attacker to prevent the computing asset from performing an authorized action, the indirect active weakness indicates that non-compliance with the stipulated control can enable the attacker to perform an unauthorized action with the computing asset, and there is no known exploit of the stipulated control that exists, and the direct active weakness indicates that non-compliance with the stipulated control can enable the attacker to perform the unauthorized action with the computing asset, and there is a known exploit of the stipulated control that exists; and adjust, by the processor, the baseline health-check risk score based on the weakness category of the stipulated control and a weakness factor of the stipulated control, wherein the weakness factor is based on a magnitude by which a state of the computing asset deviates from the stipulated control; and in response to the adjusted baseline health-check risk score satisfying a criterion associated with a predetermined threshold, perform, by the processor, a remedial action on the computing asset.

16. The computer program product of claim 15, wherein the program instructions are further executable to cause the processor to:

adjust, by the processor, the baseline health-check risk score based on an environmental factor of the computing asset, wherein the environmental factor is based on security mechanisms or security protocols associated with the computing asset.

17. The computer program product of claim 16, wherein the program instructions are further executable to cause the processor to:

adjust, by the processor, the baseline health-check risk score based on a criticality factor of the computing asset, wherein the criticality factor is based on a level of importance associated with the computing asset.

18. The computer program product of claim 16, wherein the program instructions are further executable to cause the processor to:

adjust, by the processor, the baseline health-check risk score based on a maturity factor of the computing asset, wherein the maturity factor is based on a difference between the stipulated control and a recommended control.

19. The computer program product of claim 18, wherein the program instructions are further executable to cause the processor to:

generate, by the processor, at least one of the weakness factor, the environmental factor, the criticality factor, or the maturity factor using the machine learning model.

20. The computer program product of claim 19, wherein the program instructions are further executable to cause the processor to:
- multiply, by the processor, the baseline health-check risk score to the environmental factor, thereby yielding a first quantity;
- add, by the processor, the weakness factor to the first quantity, thereby yielding a second quantity;
- multiply, by the processor, the criticality factor by the second quantity, thereby yielding a third quantity; and
- multiply, by the processor, the maturity factor by the third quantity, thereby yielding an adjusted health-check risk score corresponding to non-compliance of the computing asset with the stipulated control.

\* \* \* \* \*